United States Patent
Venkataraman et al.

(10) Patent No.: US 12,184,474 B2
(45) Date of Patent: Dec. 31, 2024

(54) ACTION RECOMMENDATIONS FOR OPERATIONAL ISSUES

(71) Applicant: PagerDuty, Inc., San Francisco, CA (US)

(72) Inventors: Vijay Shankar Venkataraman, Toronto (CA); Sanghamitra Goswami, Chicago, IL (US); Irena Grabovitch-Zuyev, Quispamsis (CA)

(73) Assignee: PagerDuty, Inc., San Francisco, CA (US)

( * ) Notice: Subject to any disclaimer, the term of this patent is extended or adjusted under 35 U.S.C. 154(b) by 0 days.

(21) Appl. No.: 18/534,900

(22) Filed: Dec. 11, 2023

(65) Prior Publication Data

US 2024/0106697 A1 Mar. 28, 2024

Related U.S. Application Data

(63) Continuation of application No. 17/697,078, filed on Mar. 17, 2022, now Pat. No. 11,888,595.

(51) Int. Cl.
*H04L 41/0631* (2022.01)
*H04L 41/0654* (2022.01)

(52) U.S. Cl.
CPC ...... *H04L 41/0631* (2013.01); *H04L 41/0654* (2013.01)

(58) Field of Classification Search
CPC .............. H04L 41/0631; H04L 41/0654
USPC ........................................................ 709/224
See application file for complete search history.

(56) References Cited

U.S. PATENT DOCUMENTS

| 7,065,188 B1 * | 6/2006 | Mei ........................ G10L 15/22 |
| | | 704/E15.04 |
| 7,526,461 B2 | 4/2009 | Srinivasa et al. |
| 7,983,401 B1 * | 7/2011 | Krinsky ................ H04M 3/527 |
| | | 455/466 |

(Continued)

OTHER PUBLICATIONS

Pagerduty, Alerting Principles, Retrieved Jun. 24, 2022 from https://response.pagerduty.com/oncall/alerting_principles/#production-service-is-failing-for-75-of-requests-automation-is-unable-to-resolve_ <https://response.pagerduty.com/oncall/alerting_principles/>, 3 pages.

(Continued)

*Primary Examiner* — David P Zarka
(74) *Attorney, Agent, or Firm* — Young Basile Hanlon & MacFarlane, P.C.

(57) ABSTRACT

An information technology (IT) component associated with a first alert having an alert type is identified. A first list of recommended actions associated with the IT component is output. The first list includes a recommended action. A first user input of a user-selected action is received. An alert-to-component likelihood between the IT component and the alert type is decreased based on a determination that the first list does not include the user-selected action. The IT component is identified as being associated with a second alert based on the alert-to-component likelihood exceeding an alert-to-component likelihood threshold. A second list of recommended actions associated with the IT component is output. The second list does not include the recommended action and includes the user-selected action. A second user input of the user-selected action is received. A request to execute the user-selected action is transmitted.

17 Claims, 9 Drawing Sheets

(56) References Cited

U.S. PATENT DOCUMENTS

| | | | |
|---|---|---|---|
| 8,494,148 B2* | 7/2013 | Erhart | H04M 3/5166 |
| | | | 379/207.15 |
| 9,465,685 B2* | 10/2016 | Adinarayan | G06F 11/0793 |
| 10,747,559 B2* | 8/2020 | Caldwell | G06F 11/079 |
| 10,817,619 B1 | 10/2020 | Kolli | |
| 10,831,585 B2 | 11/2020 | Gu | |
| 11,188,861 B1 | 11/2021 | Johnson et al. | |
| 11,341,019 B2 | 5/2022 | Toledano | |
| 2010/0083029 A1* | 4/2010 | Erickson | G06F 11/079 |
| | | | 714/2 |
| 2013/0304758 A1* | 11/2013 | Gruber | G06F 16/9535 |
| | | | 707/769 |
| 2015/0135013 A1 | 5/2015 | Thomas et al. | |
| 2017/0180219 A1 | 6/2017 | Abuelsaad et al. | |
| 2017/0180552 A1* | 6/2017 | Krinsky | H04M 3/5158 |
| 2017/0372232 A1 | 12/2017 | Maughan et al. | |
| 2018/0033017 A1* | 2/2018 | Gopalakrishnan Iyer | |
| | | | G06N 5/043 |
| 2018/0189488 A1* | 7/2018 | Arora | G06F 8/71 |
| 2019/0102438 A1 | 4/2019 | Murray et al. | |
| 2019/0108470 A1* | 4/2019 | Jain | G06Q 10/063118 |
| 2019/0371155 A1 | 12/2019 | Lakshmipathy et al. | |
| 2020/0050942 A1* | 2/2020 | Sun | G06F 40/40 |
| 2021/0067524 A1 | 3/2021 | Brandt et al. | |
| 2021/0157577 A1* | 5/2021 | Sobran | G06F 11/302 |
| 2021/0264438 A1 | 8/2021 | Singh et al. | |
| 2022/0101148 A1* | 3/2022 | Lin | G06N 20/20 |
| 2022/0208188 A1* | 6/2022 | Yoffe | G10L 15/22 |
| 2022/0261303 A1* | 8/2022 | Weaver | G06Q 10/20 |
| 2022/0376994 A1 | 11/2022 | Mishra | |
| 2023/0274124 A1* | 8/2023 | Moser | G06N 5/04 |
| | | | 706/11 |

OTHER PUBLICATIONS

Pagerduty, Alerts, Retrieved on Jun. 24, 2022 from https://support.pagerduty.com/docs/alerts, 5 pages.

aisera.com, AIOps Solutiion Overview, 2023, retrieved from https://aisera.com/products/aiops/.

U.S. Appl. No. 17/697,078, filed Mar. 17, 2022 entitled: Action Recommendations for Operational Issues.

* cited by examiner

ACTION RECOMMENDATIONS FOR OPERATIONAL ISSUES

CROSS REFERENCE TO RELATED APPLICATION

This application is a continuation of U.S. patent application Ser. No. 17/697,078, filed Mar. 17, 2022, the entire disclosure of which is incorporated herein by reference.

TECHNICAL FIELD

This disclosure relates generally to computer operations and more particularly, but not exclusively to providing real-time management of information technology operations.

BACKGROUND

Information technology (IT) systems are increasingly becoming complex, multivariate, and in some cases non-intuitive systems with varying degrees of nonlinearity. These complex IT systems may be difficult to model or accurately understand. Various monitoring systems may be arrayed to provide events, alerts, notifications, or the like, in an effort to provide visibility into operational metrics, failures, and/or correctness. However, the sheer size and complexity of these IT systems may result in a flooding of disparate event messages from disparate monitoring/reporting services.

With the increased complexity of distributed computing systems existing event reporting and/or management may not, for example, have the capability to effectively process events in complex and noisy systems. At enterprise scale, IT systems may have millions of components resulting in a complex inter-related set of monitoring systems that report millions of events from disparate subsystems. Manual techniques and pre-programmed rules are labor and computing intensive and expensive, especially in the context of large, centralized IT Operations with very complex systems distributed across large numbers of components. Further, these manual techniques may limit the ability of systems to scale and evolve for future advances in IT systems capabilities.

SUMMARY

Disclosed herein are implementations of action recommendations for operational issues.

A first aspect is a method that includes identifying that an information technology (IT) component is associated with a first alert having an alert type; outputting, for user selection, a first list of recommended actions associated with the IT component, where the first list includes a recommended action associated with the IT component; receiving a first user input of a user-selected action; determining that the first list does not include the user-selected action; decreasing an alert-to-component likelihood between the IT component and the alert type based on the determination that the first list does not include the user-selected action; identifying that the IT component is associated with a second alert based on the alert-to-component likelihood exceeding an alert-to-component likelihood threshold; outputting for user selection a second list of recommended actions associated with the IT component, where the second list of recommended actions does not include the recommended action and includes the user-selected action; receiving a second user input of the user-selected action; and transmitting a request to execute the user-selected action.

A second aspect is a system that includes a memory and a processor. The processor is configured to execute instructions stored in the memory to identify that an information technology (IT) component is associated with a first alert having an alert type; output, for user selection, a first list of recommended actions associated with the IT component, where the first list includes a recommended action associated with the IT component; receive a first user input of a user-selected action; determine that the first list does not include the user-selected action; decrease an alert-to-component likelihood between the IT component and the alert type based on the determination that the first list does not include the user-selected action; identify that the IT component is associated with a second alert based on the alert-to-component likelihood exceeding an alert-to-component likelihood threshold; output for user selection a second list of recommended actions associated with the IT component, where the second list of recommended actions does not include the recommended action and includes the user-selected action; receive a second user input of the user-selected action; and transmit a request to execute the user-selected action.

A third aspect is a non-transitory computer readable medium that stores instructions operable to cause one or more processors to perform operations that include identifying that an information technology (IT) component is associated with a first alert having an alert type; outputting, for user selection, a first list of recommended actions associated with the IT component, where the first list includes a recommended action associated with the IT component; receiving a first user input of a user-selected action; determining that the first list does not include the user-selected action; decreasing an alert-to-component likelihood between the IT component and the alert type based on the determination that the first list does not include the user-selected action; identifying that the IT component is associated with a second alert based on the alert-to-component likelihood exceeding an alert-to-component likelihood threshold; outputting for user selection a second list of recommended actions associated with the IT component, where the second list of recommended actions does not include the recommended action and includes the user-selected action; receiving a second user input of the user-selected action; and transmitting a request to execute the user-selected action.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
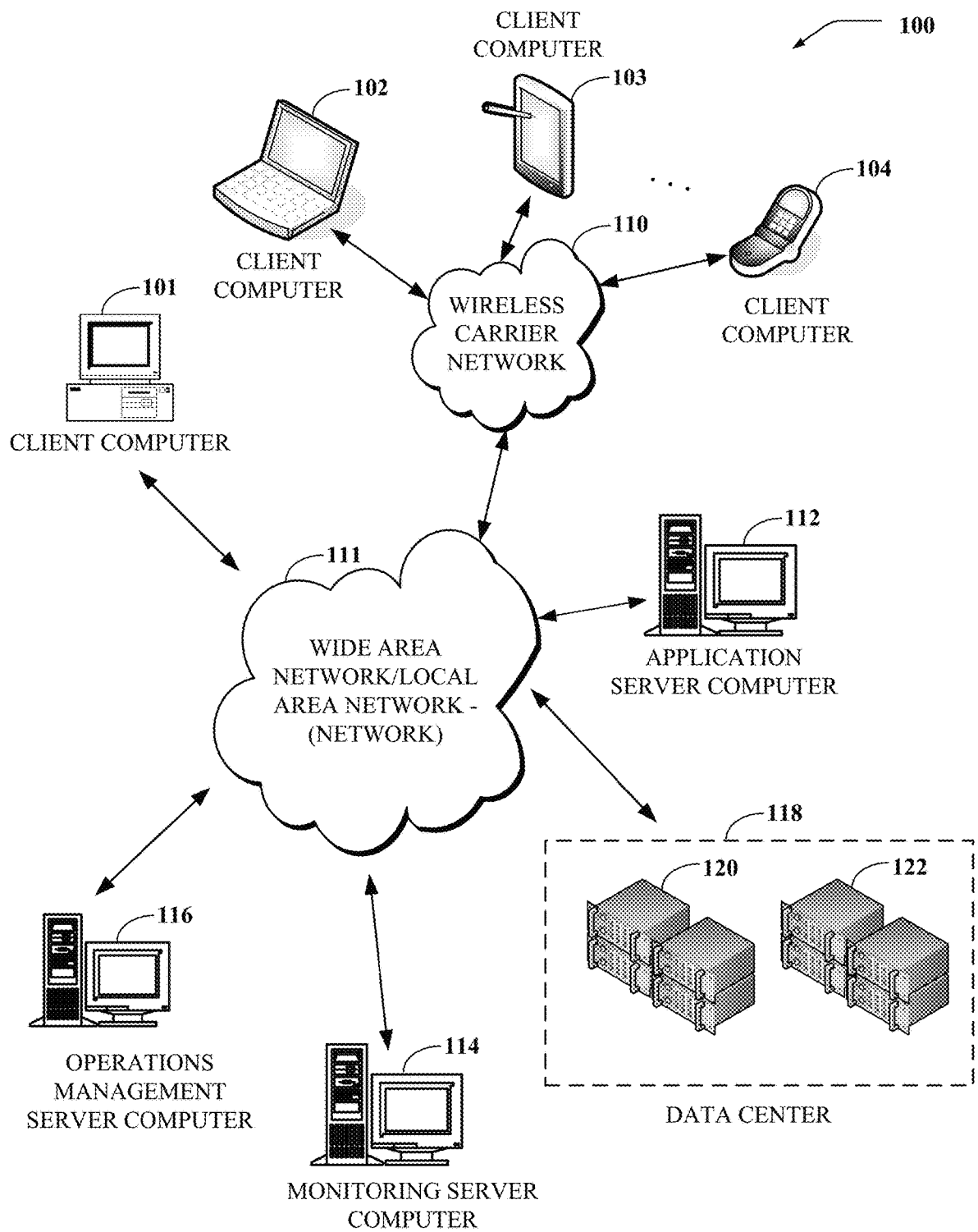
FIG. 1 shows components of one embodiment of a computing environment for event management.

An event management bus (EMB) is implemented using a computer system and may be arranged to monitor, manage, or compare the operations of one or more organizations. The EMB may be arranged to accept various events that indicate conditions occurring in the one or more organizations (i.e., in the IT environments of the organizations). The EMB may be arranged to manage several separate organizations at the same time. For example, an event can be an indication of a state of change to an information technology (IT) component of an organization. For example, an event can be or describe a fact at a moment in time that may consist of a single condition or a group of correlated conditions that have been monitored and classified into an actionable state. As such, a monitoring tool of an organization may detect a condition in the IT environment (such as with respect to an IT component) of the organization and transmit a corresponding event to the EMB. Depending on the level of impact (e.g., a level of degradation of a service), if any, to one or more constituents of a managed organization, an event may directly or indirectly trigger (e.g., may be, may be classified as, may be converted into, or may spawn) an alert.

Non-limiting examples of events may include that a monitored operating system process is not running, that a virtual machine is restarting, that disk space on a certain device is low, that processor utilization on a certain device is higher than a threshold, that a shopping cart service of an e-commerce site is unavailable, that a digital certificate has or is expiring, that a certain web server is returning a 503 error code (indicating that web server is not ready to handle requests), that a customer relationship management (CRM) system is down (e.g., unavailable) such as because it is not responding to ping requests, and so on.

At a high level, an event associated with (e.g., about,) an IT component may be received at an ingestion software of the EMB, accepted by the ingestion software and queued for processing, and then processed. Processing an event can include triggering (e.g., creating, generating, instantiating, etc.) a corresponding alert and a corresponding incident in the EMB, sending a notification of the incident to a responder (i.e., a person, a group of persons, etc.), and/or triggering a response (e.g., a resolution) to the incident.

To be resolved, an alert may require a human (i.e., a responder) to perform or cause to be performed an action. The incident associated with the alert may or may be used to notify the responder who can acknowledge (e.g., assume responsibility for resolving) and resolve the incident. An acknowledged incident is an incident that is being worked on but is not yet resolved. The user that acknowledges an incident claims ownership of the incident, which may halt any established escalation processes. As such, notifications provide a way for responders to acknowledge that they are working on an incident or that the incident has been resolved. The responder may indicate that the responder resolved the incident using an interface (e.g., a graphical user interface) of the EMB.

The EMB may provide, or may allow to be configured, actions that responders can select (e.g., choose) for resolving incidents (or, equivalently, the corresponding alerts) associated with IT components. To resolve (i.e., to attempt to resolve) an alert (or incident), a responder may select one or more of the actions. An action may be or include a script, a program, application programming interface (API) calls, a set of instructions, manual steps, the like, or a combination thereof that may be invoked (e.g., executed) in an attempt to resolve an alert. An action may be a parametrized action. That is, the action may include placeholders to be substitutes for actual values. Values for the placeholders may be populated by the responder selecting the action, may be obtained (e.g., derived) from the alert, or a combination thereof. The EMB may cause an action to be performed, such as by communicating the action to an affected IT component or another IT component that is capable of performing the action.

To illustrate, an alert may indicate (e.g., may be titled) "Excessive CPU usage by process MyProgram on server 192.168.1.1." One of the configured actions available at the EMB may be ssh root@<server> "ps -ef|grep<ProcessName>|grep -v grep|awk '{print \$2}'"|xargs kill -15. The parameters of this actions are <server> and <ProcessName>, the values of which may be automatically extracted from the alert or manually provided by the responder who selects the action. As such, the responder may select the action and provide (e.g., fill in) the parameter values therewith resulting in the action root@192.168.1.1 "ps -ef|grep MyProgram|grep -v grep|awk '{print $2}'"|xargs kill -15. This action opens a remote shell on the server having the address 192.168.1.1, find the process ID of the executing program named MyProgram, and issues a request to the process to close.

As can be appreciated, IT systems may include or use many IT components. Such IT components may include, to name a few, open-source or proprietary libraries, open-source or proprietary operating systems, open-source or proprietary database systems, cloud computing services, on-premises computing services, open-source or proprietary software platforms, servers, routers, virtual machine, and so on. The malfunction of any one of the IT components can lead to an operational issue. As mentioned, an event corresponding to the operational issue may be received at an EMB, which in turns may trigger an alert and an incident. Alerts are often resolved by modifying the functioning (e.g., affecting the configuration or execution) of one or more underlying IT components.

Thus, to effectively resolve an alert, a responder has to identify the affected IT component(s) (i.e., the IT component(s) that triggered the alert) and identify (e.g., choose) an appropriate action that resolves the alert. However, responders may not be able to readily identify the affected components, identify the relevant actions, or both. These problems are compounded by the ever-evolving nature of IT infrastructure.

Existing systems are incapable or deficient in identifying IT components from alerts, recommending to responders actions relevant to the alerts or the identified IT components, or both. Thus, a responder may resort to trial and error. That is, a responder may choose an action for execution with the hope that the action will resolve the alert. If the action does not resolve the alert, then the responder may choose another action. This repetitive trial-and-error process may continue until the alert is resolved.

Resolving alerts by trial-and-error can prolong the time to resolution, which may lead to user frustration (i.e., direct or indirect users of the IT component(s)), unavailability of services for longer periods of time, and a waste of responders' time. Additionally, as the EMB expends resources in executing actions, resolving alerts by trial-and-error can waste computation and network resources, and may degrade the performance of the EMB for other users, at least with respect to processing other events, alerts, and incidents. Thus, the trial-and-error iterative process can result in user and responder productivity loss in addition to increased resource utilization.

The possibility of degraded performance and increased usage of the computational and network resources may also include substantially increased investment in processing, memory, and storage resources and may also result in increased energy expenditures (needed to operate those increased processing, memory, and storage resources, and for the network transmission of the database commands) and associated emissions that may result from the generation of that energy.

EMBs according to this disclosure can identify (e.g., extract) an IT component (e.g., one or more IT components) associated with an alert and recommend to responders actions associated with the IT component. A component-extraction tool of an EMB may identify the IT component based on data associated with the alert (e.g., a title or a payload of the alert). Extracting an IT component from an alert, as used herein, includes identifying the IT component based on the alert. An action-selection tool of the EMB may identify the actions in a library of component-based actions. The identified actions are presented to a responder. The responder may choose one or more actions to be performed for resolving the alert. The actions chosen by the responder may or may not be included in the identified actions. Using learning techniques, the component-extraction tool can improve its IT component identification based on actions selected by the responder and the results of executing those actions (e.g., whether the actions resolved the alert or not). Using learning techniques, the action-selection tool can improve its action identification based on whether the responder selected an identified action (i.e., whether the responder chose an action recommended by the EMB or some other action).

Action recommendations for operational issues can preserve computational resources and reduce responder load. Implementations according to this disclosure enable responders to readily identify actions for resolving alerts. Additionally, the learning algorithms of the component-extraction tool and the action-selection tool enable the EMB to adapt to changes (e.g., IT components added, removed, or modified) in managed IT environments and connections (e.g., dependencies) between IT components of the IT environments. As responders choose actions to execute, action recommendations are improved based on which action(s) the responders chose and whether the selected actions resolved the alerts. Additionally, IT component extraction can be improved based on the actions execution and feedback data regarding whether the actions were successful in resolving alerts. That responders chose an action for an alert can be a signal that the IT component associated with the action may be at least a part (e.g., a cause) of the alert. Such signals, in addition to other described herein, can be used with classification techniques to improve component extraction.

The term "organization" or "managed organization" as used herein refers to a business, a company, an association, an enterprise, a confederation, or the like.

The term "event," as used herein, can refer to one or more outcomes, conditions, or occurrences that may be detected or observed by an event management bus. An event management bus (which can also be referred to as an event ingestion and processing system) may be configured to monitor various types of events depending on needs of an industry and/or technology area. For example, information technology services may generate events in response to one or more conditions, such as, computers going offline, memory overutilization, CPU overutilization, storage quotas being met or exceeded, applications failing or otherwise becoming unavailable, networking problems (e.g., latency, excess traffic, unexpected lack of traffic, intrusion attempts, or the like), electrical problems (e.g., power outages, voltage fluctuations, or the like), customer service requests, or the like, or combination thereof.

Events may be provided to the event management bus using one or more messages, emails, telephone calls, library function calls, API calls, including, any signals provided to an event management bus indicating that an event has occurred. One or more third party and/or external systems may be configured to generate event messages that are provided to the event management bus.

The term "responder" as used herein can refer to a person or entity, represented or identified by persons, that may be responsible for responding to an event associated with a monitored application or service. A responder is responsible for responding to one or more notification events. For example, responders may be members of an information technology (IT) team providing support to employees of a company. Responders may be notified if an event or incident they are responsible for handling at that time is encountered. In some embodiments, a scheduler application may be arranged to associate one or more responders with times that they are responsible for handling particular events (.e.g., times when they are on-call to maintain various IT services for a company). A responder that is determined to be responsible for handling a particular event may be referred to as a responsible responder. Responsible responders may be considered to be on-call and/or active during the period of time they are designated by the schedule to be available.

The term "incident" as used herein can refer to a condition or state in the managed networking environments that requires some form of resolution by a user (i.e., a responder) or automated service. Typically, incidents may be a failure or error that occurs in the operation of a managed network and/or computing environment. One or more events may be associated with one or more incidents. However, not all events are associated with incidents.

The term "incident response" as used herein can refer to the actions, resources, services, messages, notifications, alerts, events, or the like, related to resolving one or more incidents. Accordingly, services that may be impacted by a pending incident, may be added to the incident response associated with the incident. Likewise, resources responsible for supporting or maintaining the services may also be added to the incident response. Further, log entries, journal entries, notes, timelines, task lists, status information, or the like, may be part of an incident response.

The term "notification message," "notification event," or "notification" as used herein can refer to a communication provided by an incident management system to a message provider for delivery to one or more responsible resources or responders. A notification event may be used to inform one or more responsible resources that one or more event messages were received. For example, in at least one of the various embodiments, notification messages may be provided to the one or more responsible resources using SMS texts, MMS texts, email, Instant Messages, mobile device push notifications, HTTP requests, voice calls (telephone calls, Voice Over IP calls (VOIP), or the like), library function calls, API calls, URLs, audio alerts, haptic alerts, other signals, or the like, or combination thereof.

The term "team" or "group" as used herein refers to one or more responders that may be jointly responsible for maintaining or supporting one or more services or system for an organization.

The following briefly describes the embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

FIG. 1 shows components of one embodiment of a computing environment 100 for event management. Not all the components may be required to practice various embodiments, and variations in the arrangement and type of the components may be made. As shown, the computing environment 100 includes local area networks (LANs)/wide area networks (WANs) (i.e., a network 111), a wireless network 110, client computers 101-104, an application server computer 112, a monitoring server computer 114, and an operations management server computer 116, which may be or may implement an EMB.

Generally, the client computers 102-104 may include virtually any portable computing device capable of receiving and sending a message over a network, such as the network 111, the wireless network 110, or the like. The client computers 102-104 may also be described generally as client computers that are configured to be portable. Thus, the client computers 102-104 may include virtually any portable computing device capable of connecting to another computing device and receiving information. Such devices include portable devices such as, cellular telephones, smart phones, display pagers, radio frequency (RF) devices, infrared (IR) devices, Personal Digital Assistants (PDA's), handheld computers, laptop computers, wearable computers, tablet computers, integrated devices combining one or more of the preceding devices, or the like. Likewise, the client computers 102-104 may include Internet-of-Things (IOT) devices as well. Accordingly, the client computers 102-104 typically range widely in terms of capabilities and features. For example, a cell phone may have a numeric keypad and a few lines of monochrome Liquid Crystal Display (LCD) on which only text may be displayed. In another example, a mobile device may have a touch sensitive screen, a stylus, and several lines of color LCD in which both text and graphics may be displayed.

The client computer 101 may include virtually any computing device capable of communicating over a network to send and receive information, including messaging, performing various online actions, or the like. The set of such devices may include devices that typically connect using a wired or wireless communications medium such as personal computers, multiprocessor systems, microprocessor-based or programmable consumer electronics, network Personal Computers (PCs), or the like. In one embodiment, at least some of the client computers 102-104 may operate over wired and/or wireless network. Today, many of these devices include a capability to access and/or otherwise communicate over a network such as the network 111 and/or the wireless network 110. Moreover, the client computers 102-104 may access various computing applications, including a browser, or other web-based application.

In one embodiment, one or more of the client computers 101-104 may be configured to operate within a business or other entity to perform a variety of services for the business or other entity. For example, a client of the client computers 101-104 may be configured to operate as a web server, an accounting server, a production server, an inventory server, or the like. However, the client computers 101-104 are not constrained to these services and may also be employed, for example, as an end-user computing node, in other embodiments. Further, it should be recognized that more or less client computers may be included within a system such as described herein, and embodiments are therefore not constrained by the number or type of client computers employed.

A web-enabled client computer may include a browser application that is configured to receive and to send web pages, web-based messages, or the like. The browser application may be configured to receive and display graphics, text, multimedia, or the like, employing virtually any web-based language, including a wireless application protocol messages (WAP), or the like. In one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, or the like, to display and send a message. In one embodiment, a user of the client computer may employ the browser application to perform various actions over a network.

The client computers 101-104 also may include at least one other client application that is configured to receive and/or send data, operations information, between another computing device. The client application may include a capability to provide requests and/or receive data relating to managing, operating, or configuring the operations management server computer 116.

The wireless network 110 can be configured to couple the client computers 102-104 with network 111. The wireless network 110 may include any of a variety of wireless sub-networks that may further overlay stand-alone ad-hoc networks, or the like, to provide an infrastructure-oriented connection for the client computers 102-104. Such sub-networks may include mesh networks, Wireless LAN (WLAN) networks, cellular networks, or the like.

The wireless network 110 may further include an autonomous system of terminals, gateways, routers, or the like connected by wireless radio links, or the like. These connectors may be configured to move freely and randomly and organize themselves arbitrarily, such that the topology of the wireless network 110 may change rapidly.

The wireless network 110 may further employ a plurality of access technologies including 2nd (2G), 3rd (3G), 4th (4G), 5th (5G) generation radio access for cellular systems, WLAN, Wireless Router (WR) mesh, or the like. Access technologies such as 2G, 3G, 4G, and future access networks may enable wide area coverage for mobile devices, such as the client computers 102-104 with various degrees of mobility. For example, the wireless network 110 may enable a radio connection through a radio network access such as Global System for Mobil communication (GSM), General Packet Radio Services (GPRS), Enhanced Data GSM Environment (EDGE), Wideband Code Division Multiple Access (WCDMA), or the like. In essence, the wireless network 110 may include virtually any wireless communication mechanism by which information may travel between the client computers 102-104 and another computing device, network, or the like.

The network 111 can be configured to couple network devices with other computing devices, including, the operations management server computer 116, the monitoring server computer 114, the application server computer 112, the client computer 101, and through the wireless network 110 to the client computers 102-104. The network 111 can be enabled to employ any form of computer readable media for communicating information from one electronic device to another. Also, the network 111 can include the internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, Integrated Services Digital Networks (IS-DNs), Digital Subscriber Lines (DSLs), wireless links including satellite links, or other communications links known to those skilled in the art. For example, various Internet Protocols (IP), Open Systems Interconnection (OSI) architectures, and/or other communication protocols, architectures, models, and/or standards, may also be employed within the network 111 and the wireless network 110. Furthermore, remote computers and other related electronic devices could be remotely connected to either LANs or WANs via a modem and temporary telephone link. In essence, the network 111 includes any communication method by which information may travel between computing devices.

Additionally, communication media typically embodies computer-readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media. Such communication media is distinct from, however, computer-readable devices described in more detail below.

Figure 3:
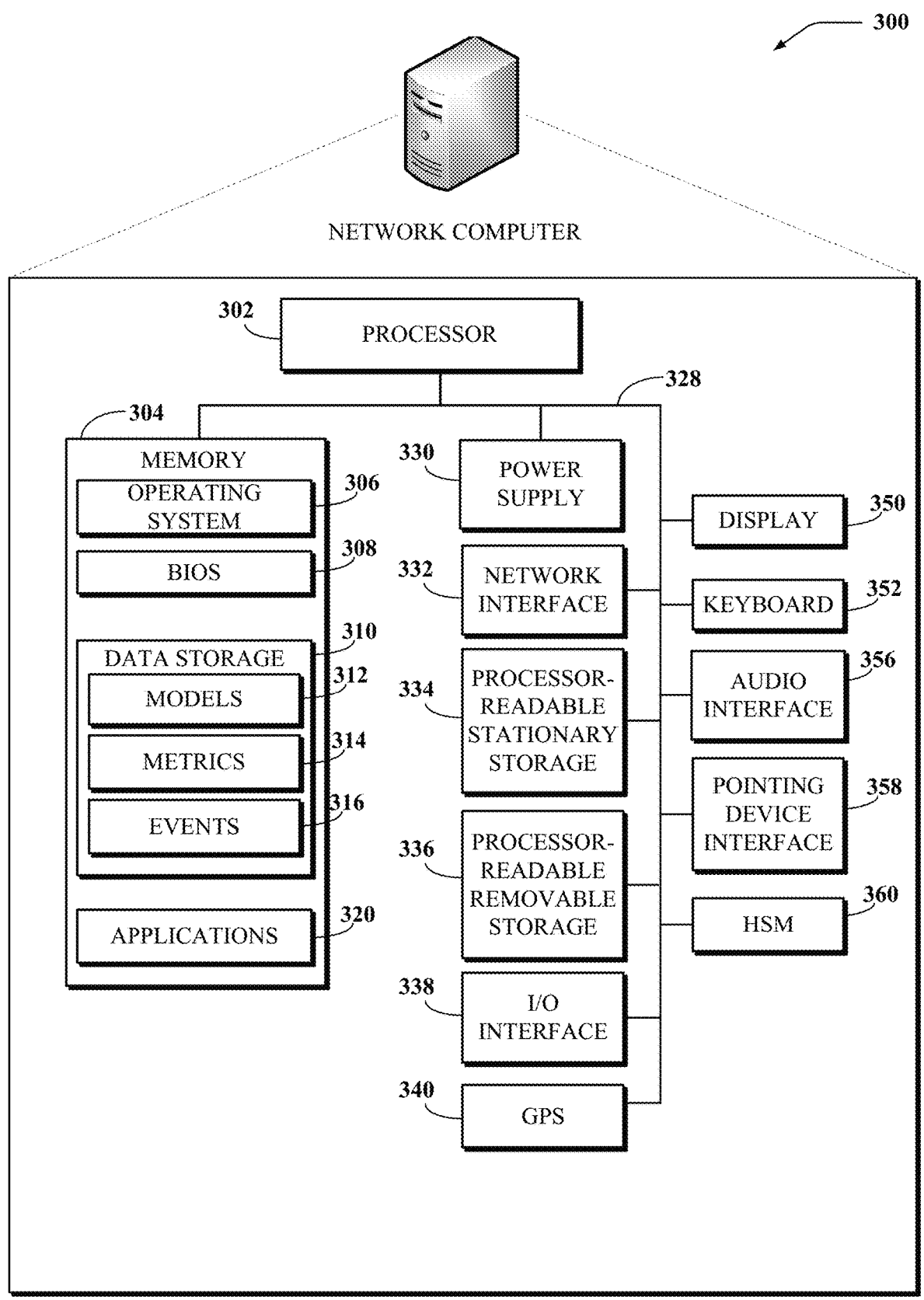
FIG. 3 shows one embodiment of a network computer that may at least partially implement one of the various embodiments.

The operations management server computer 116 may include virtually any network computer usable to provide computer operations management services, such as a network computer, as described with respect to FIG. 3. In one embodiment, the operations management server computer 116 employs various techniques for managing the operations of computer operations, networking performance, customer service, customer support, resource schedules and notification policies, event management, or the like. Also, the operations management server computer 116 may be arranged to interface/integrate with one or more external systems such as telephony carriers, email systems, web services, or the like, to perform computer operations management. Further, the operations management server computer 116 may obtain various events and/or performance metrics collected by other systems, such as, the monitoring server computer 114.

In at least one of the various embodiments, the monitoring server computer 114 represents various computers that may be arranged to monitor the performance of computer operations for an entity (e.g., company or enterprise). For example, the monitoring server computer 114 may be arranged to monitor whether applications/systems are operational, network performance, trouble tickets and/or their resolution, or the like. In some embodiments, one or more of the functions of the monitoring server computer 114 may be performed by the operations management server computer 116.

Devices that may operate as the operations management server computer 116 include various network computers, including, but not limited to personal computers, desktop computers, multiprocessor systems, microprocessor-based or programmable consumer electronics, network PCs, server devices, network appliances, or the like. It should be noted that while the operations management server computer 116 is illustrated as a single network computer, the invention is not so limited. Thus, the operations management server computer 116 may represent a plurality of network computers. For example, in one embodiment, the operations management server computer 116 may be distributed over a plurality of network computers and/or implemented using cloud architecture.

Moreover, the operations management server computer 116 is not limited to a particular configuration. Thus, the operations management server computer 116 may operate using a master/slave approach over a plurality of network computers, within a cluster, a peer-to-peer architecture, and/or any of a variety of other architectures.

In some embodiments, one or more data centers, such as a data center 118, may be communicatively coupled to the wireless network 110 and/or the network 111. In at least one of the various embodiments, the data center 118 may be a portion of a private data center, public data center, public cloud environment, or private cloud environment. In some embodiments, the data center 118 may be a server room/data center that is physically under the control of an organization. The data center 118 may include one or more enclosures of network computers, such as, an enclosure 120 and an enclosure 122.

The enclosure 120 and the enclosure 122 may be enclosures (e.g., racks, cabinets, or the like) of network computers and/or blade servers in the data center 118. In some embodiments, the enclosure 120 and the enclosure 122 may be arranged to include one or more network computers arranged to operate as operations management server computers, monitoring server computers (e.g., the operations management server computer 116, the monitoring server computer 114, or the like), storage computers, or the like, or combination thereof. Further, one or more cloud instances may be operative on one or more network computers included in the enclosure 120 and the enclosure 122.

The data center 118 may also include one or more public or private cloud networks. Accordingly, the data center 118 may comprise multiple physical network computers, interconnected by one or more networks, such as, networks similar to and/or the including network 111 and/or wireless network 110. The data center 118 may enable and/or provide one or more cloud instances (not shown). The number and composition of cloud instances may be vary depending on the demands of individual users, cloud network arrangement, operational loads, performance considerations, application needs, operational policy, or the like. In at least one of the various embodiments, the data center 118 may be arranged as a hybrid network that includes a combination of hardware resources, private cloud resources, public cloud resources, or the like.

As such, the operations management server computer 116 is not to be construed as being limited to a single environment, and other configurations, and architectures are also contemplated. The operations management server computer 116 may employ processes such as described below in conjunction with at least some of the figures discussed below to perform at least some of its actions.

Figure 2:
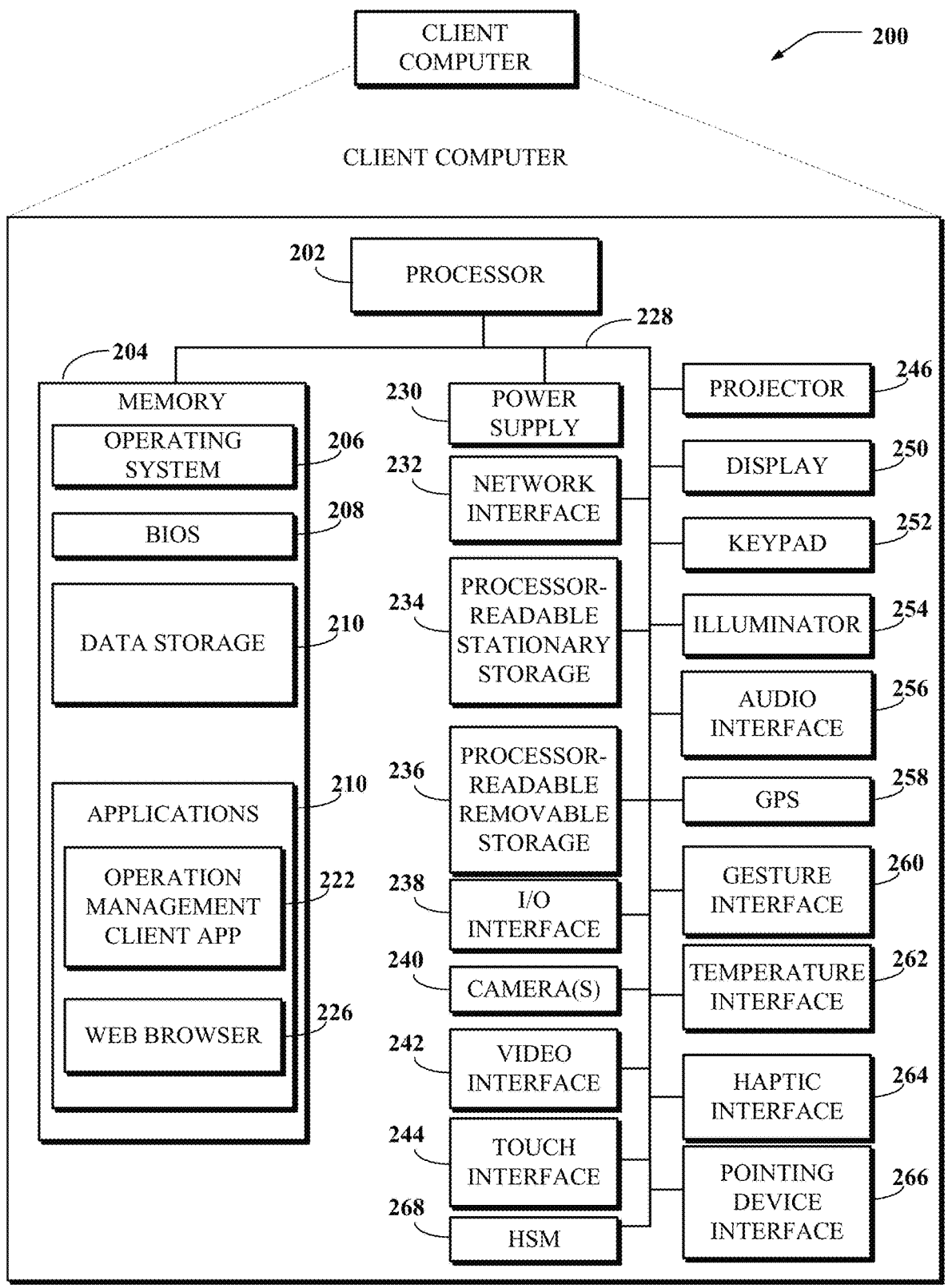
FIG. 2 shows one embodiment of a client computer.

FIG. 2 shows one embodiment of a client computer 200. The client computer 200 may include more or less components than those shown in FIG. 2. The client computer 200 may represent, for example, at least one embodiment of mobile computers or client computers shown in FIG. 1.

The client computer 200 may include a processor 202 in communication with a memory 204 via a bus 228. The client computer 200 may also include a power supply 230, a network interface 232, an audio interface 256, a display 250, a keypad 252, an illuminator 254, a video interface 242, an input/output interface (i.e., an I/O interface 238), a haptic interface 264, a global positioning systems (GPS) receiver 258, an open-air gesture interface 260, a temperature interface 262, a camera 240, a projector 246, a pointing device interface 266, a processor-readable stationary storage device 234, and a non-transitory processor-readable removable storage device 236. The client computer 200 may optionally communicate with a base station (not shown), or directly with another computer. And in one embodiment, although not shown, a gyroscope may be employed within the client computer 200 to measuring or maintaining an orientation of the client computer 200.

The power supply 230 may provide power to the client computer 200. A rechargeable or non-rechargeable battery may be used to provide power. The power may also be provided by an external power source, such as an AC adapter or a powered docking cradle that supplements or recharges the battery.

The network interface 232 includes circuitry for coupling the client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. The network interface 232 is sometimes known as a transceiver, transceiving device, or network interface card (NIC).

The audio interface 256 may be arranged to produce and receive audio signals such as the sound of a human voice. For example, the audio interface 256 may be coupled to a speaker and microphone (not shown) to enable telecommunication with others or generate an audio acknowledgement for some action. A microphone in the audio interface 256 can also be used for input to or control of the client computer 200, e.g., using voice recognition, detecting touch based on sound, and the like.

The display 250 may be a liquid crystal display (LCD), gas plasma, electronic ink, light emitting diode (LED), Organic LED (OLED) or any other type of light reflective or light transmissive display that can be used with a computer. The display 250 may also include a touch interface 244 arranged to receive input from an object such as a stylus or a digit from a human hand, and may use resistive, capacitive, surface acoustic wave (SAW), infrared, radar, or other technologies to sense touch or gestures.

The projector 246 may be a remote handheld projector or an integrated projector that is capable of projecting an image on a remote wall or any other reflective object such as a remote screen.

The video interface 242 may be arranged to capture video images, such as a still photo, a video segment, an infrared video, or the like. For example, the video interface 242 may be coupled to a digital video camera, a web-camera, or the like. The video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

The keypad 252 may comprise any input device arranged to receive input from a user. For example, the keypad 252 may include a push button numeric dial, or a keyboard. The keypad 252 may also include command buttons that are associated with selecting and sending images.

The illuminator 254 may provide a status indication or provide light. The illuminator 254 may remain active for specific periods of time or in response to event messages. For example, when the illuminator 254 is active, it may backlight the buttons on the keypad 252 and stay on while the client computer is powered. Also, the illuminator 254 may backlight these buttons in various patterns when particular actions are performed, such as dialing another client computer. The illuminator 254 may also cause light sources positioned within a transparent or translucent case of the client computer to illuminate in response to actions.

Further, the client computer 200 may also comprise a hardware security module (i.e., an HSM 268) for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, the HSM 268 may be a stand-alone computer, in other cases, the HSM 268 may be arranged as a hardware card that may be added to a client computer.

The I/O 238 can be used for communicating with external peripheral devices or other computers such as other client computers and network computers. The peripheral devices may include an audio headset, display screen glasses, remote speaker system, remote speaker and microphone system, and the like. The I/O interface 238 can utilize one or more technologies, such as Universal Serial Bus (USB), Infrared, WiFi, WiMax, Bluetooth™, and the like.

The I/O interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to the client computer 200.

The haptic interface 264 may be arranged to provide tactile feedback to a user of the client computer. For example, the haptic interface 264 may be employed to vibrate the client computer 200 in a particular way when another user of a computer is calling. The temperature interface 262 may be used to provide a temperature measurement input or a temperature changing output to a user of the client computer 200. The open-air gesture interface 260 may sense physical gestures of a user of the client computer 200, for example, by using single or stereo video cameras, radar, a gyroscopic sensor inside a computer held or worn by the user, or the like. The camera 240 may be used to track physical eye movements of a user of the client computer 200.

The GPS transceiver 258 can determine the physical coordinates of the client computer 200 on the surface of the earth, which typically outputs a location as latitude and longitude values. The GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of the client computer 200 on the surface of the earth. It is understood that under different conditions, the GPS transceiver 258 can determine a physical location for the client computer 200. In at least one embodiment, however, the client computer 200 may, through other components, provide other information that may be employed to determine a physical location of the client computer, including for example, a Media Access Control (MAC) address, IP address, and the like.

Human interface components can be peripheral devices that are physically separate from the client computer 200, allowing for remote input or output to the client computer 200. For example, information routed as described here through human interface components such as the display 250 or the keypad 252 can instead be routed through the network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Bluetooth LE, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include a web browser application 226 that is configured to receive and to send web pages, web-based messages, graphics, text, multimedia, and the like. The client computer's browser application may employ virtually any programming language, including a wireless application protocol messages (WAP), and the like. In at least one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

The memory 204 may include RAM, ROM, or other types of memory. The memory 204 illustrates an example of computer-readable storage media (devices) for storage of information such as computer-readable instructions, data structures, program modules or other data. The memory 204 may store a BIOS 208 for controlling low-level operation of the client computer 200. The memory may also store an operating system 206 for controlling the operation of the client computer 200. It will be appreciated that this component may include a general-purpose operating system such as a version of UNIX, or LINUX™, or a specialized client computer communication operating system such as Windows Phone™, or IOS® operating system. The operating system may include, or interface with, a Java virtual machine module that enables control of hardware components or operating system operations via Java application programs.

The memory 204 may further include one or more data storage 210, which can be utilized by the client computer 200 to store, among other things, the applications 220 or other data. For example, the data storage 210 may also be employed to store information that describes various capabilities of the client computer 200. The information may then be provided to another device or computer based on any of a variety of methods, including being sent as part of a header during a communication, sent upon request, or the like. The data storage 210 may also be employed to store social networking information including address books, buddy lists, aliases, user profile information, or the like. The data storage 210 may further include program code, data, algorithms, and the like, for use by a processor, such as the processor 202 to execute and perform actions. In one embodiment, at least some of the data storage 210 might also be stored on another component of the client computer 200, including, but not limited to, the non-transitory processor-readable removable storage device 236, the processor-readable stationary storage device 234, or external to the client computer.

The applications 220 may include computer executable instructions which, when executed by the client computer 200, transmit, receive, or otherwise process instructions and data. The applications 220 may include, for example, an operations management client application 222. In at least one of the various embodiments, the operations management client application 222 may be used to exchange communications to and from the operations management server computer 116 of FIG. 1, the monitoring server computer 114 of FIG. 1, the application server computer 112 of FIG. 1, or the like. Exchanged communications may include, but are not limited to, queries, searches, messages, notification messages, events, alerts, performance metrics, log data, API calls, or the like, combination thereof.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), the client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the client computer 200 may include a hardware microcontroller instead of a CPU. In at least one embodiment, the microcontroller may directly execute its own embedded logic to perform actions and access its own internal memory and its own external Input and Output Interfaces (e.g., hardware pins or wireless transceivers) to perform actions, such as System On a Chip (SOC), or the like.

FIG. 3 shows one embodiment of network computer 300 that may at least partially implement one of the various embodiments. The network computer 300 may include more or less components than those shown in FIG. 3. The network computer 300 may represent, for example, one embodiment of at least one EMB, such as the operations management server computer 116 of FIG. 1, the monitoring server computer 114 of FIG. 1, or an application server computer 112 of FIG. 1. Further, in some embodiments, the network computer 300 may represent one or more network computers included in a data center, such as, the data center 118, the enclosure 120, the enclosure 122, or the like.

As shown in the FIG. 3, the network computer 300 includes a processor 302 in communication with a memory 304 via a bus 328. The network computer 300 also includes a power supply 330, a network interface 332, an audio interface 356, a display 350, a keyboard 352, an input/output interface (i.e., an I/O interface 338), a processor-readable stationary storage device 334, and a processor-readable removable storage device 336. The power supply 330 provides power to the network computer 300.

The network interface 332 includes circuitry for coupling the network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. The network interface 332 is sometimes known as a transceiver, transceiving device, or network interface card (NIC). The network computer 300 may optionally communicate with a base station (not shown), or directly with another computer.

The audio interface 356 is arranged to produce and receive audio signals such as the sound of a human voice. For example, the audio interface 356 may be coupled to a speaker and microphone (not shown) to enable telecommunication with others or generate an audio acknowledgement for some action. A microphone in the audio interface 356 can also be used for input to or control of the network computer 300, for example, using voice recognition.

The display 350 may be a liquid crystal display (LCD), gas plasma, electronic ink, light emitting diode (LED), Organic LED (OLED) or any other type of light reflective or light transmissive display that can be used with a computer. The display 350 may be a handheld projector or pico projector capable of projecting an image on a wall or other object.

The network computer 300 may also comprise the I/O interface 338 for communicating with external devices or computers not shown in FIG. 3. The I/O interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, the I/O interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to the network computer 300. Human interface components can be physically separate from network computer 300, allowing for remote input or output to the network computer 300. For example, information routed as described here through human interface components such as the display 350 or the keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through a pointing device interface 358 to receive user input.

A GPS transceiver 340 can determine the physical coordinates of network computer 300 on the surface of the Earth, which typically outputs a location as latitude and longitude values. The GPS transceiver 340 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of the network computer 300 on the surface of the Earth. It is understood that under different conditions, the GPS transceiver 340 can determine a physical location for the network computer 300. In at least one embodiment, however, the network computer 300 may, through other components, provide other information that may be employed to determine a physical location of the client computer, including for example, a Media Access Control (MAC) address, IP address, and the like.

The memory 304 may include Random Access Memory (RAM), Read-Only Memory (ROM), or other types of memory. The memory 304 illustrates an example of computer-readable storage media (devices) for storage of information such as computer-readable instructions, data structures, program modules or other data. The memory 304 stores a basic input/output system (i.e., a BIOS 308) for controlling low-level operation of the network computer 300. The memory also stores an operating system 306 for controlling the operation of the network computer 300. It will be appreciated that this component may include a general-purpose operating system such as a version of UNIX, or LINUX™, or a specialized operating system such as Microsoft Corporation's Windows® operating system, or the Apple Corporation's IOS® operating system. The operating system may include, or interface with a Java virtual machine module that enables control of hardware components or operating system operations via Java application programs. Likewise, other runtime environments may be included.

The memory 304 may further include a data storage 310, which can be utilized by the network computer 300 to store, among other things, applications 320 or other data. For example, the data storage 310 may also be employed to store information that describes various capabilities of the network computer 300. The information may then be provided to another device or computer based on any of a variety of methods, including being sent as part of a header during a communication, sent upon request, or the like. The data storage 310 may also be employed to store social networking information including address books, buddy lists, aliases, user profile information, or the like. The data storage 310 may further include program code, instructions, data, algorithms, and the like, for use by a processor, such as the processor 302 to execute and perform actions such as those actions described below. In one embodiment, at least some of the data storage 310 might also be stored on another component of the network computer 300, including, but not limited to, the non-transitory media inside processor-readable removable storage device 336, the processor-readable stationary storage device 334, or any other computer-readable storage device within the network computer 300 or external to network computer 300. The data storage 310 may include, for example, models 312, operations metrics 314, events 316, or the like.

The applications 320 may include computer executable instructions which, when executed by the network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. The applications 320 may be or include executable instructions, which can be loaded or copied, in whole or in part, from non-volatile memory to volatile memory to be executed by the processor 302. For example, the applications 320 can include instructions for performing some or all of the techniques of this disclosure. In at least one of the various embodiments, one or more of the applications may be implemented as modules or components of another application. Further, in at least one of the various embodiments, applications may be implemented as operating system extensions, modules, plugins, or the like.

Furthermore, in at least one of the various embodiments, at least some of the applications 320 may be operative in a cloud-based computing environment. In at least one of the various embodiments, these applications, and others, that comprise the management platform may be executing within virtual machines or virtual servers that may be managed in a cloud-based based computing environment. In at least one of the various embodiments, in this context the applications may flow from one physical network computer within the cloud-based environment to another depending on performance and scaling considerations automatically managed by the cloud computing environment. Likewise, in at least one of the various embodiments, virtual machines or virtual servers dedicated to at least some of the applications 320 may be provisioned and de-commissioned automatically.

In at least one of the various embodiments, the applications may be arranged to employ geo-location information to select one or more localization features, such as, time zones, languages, currencies, calendar formatting, or the like. Localization features may be used in user-interfaces and well as internal processes or databases. Further, in some embodiments, localization features may include information regarding culturally significant events or customs (e.g., local holidays, political events, or the like) In at least one of the various embodiments, geo-location information used for selecting localization information may be provided by the GPS transceiver 340. Also, in some embodiments, geolocation information may include information providing using one or more geolocation protocol over the networks, such as, the wireless network 108 or the network 111.

Also, in at least one of the various embodiments, at least some of the applications 320, may be located in virtual servers running in a cloud-based computing environment rather than being tied to one or more specific physical network computers.

Further, the network computer 300 may also comprise hardware security module (i.e., an HSM 360) for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, the HSM 360 may be a stand-alone network computer, in other cases, the HSM 360 may be arranged as a hardware card that may be installed in a network computer.

Additionally, in one or more embodiments (not shown in the figures), the network computer 300 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include a hardware microcontroller instead of a CPU. In at least one embodiment, the microcontroller may directly execute its own embedded logic to perform actions and access its own internal memory and its own external Input and Output Interfaces (e.g., hardware pins or wireless transceivers) to perform actions, such as System On a Chip (SOC), or the like.

Figure 4:
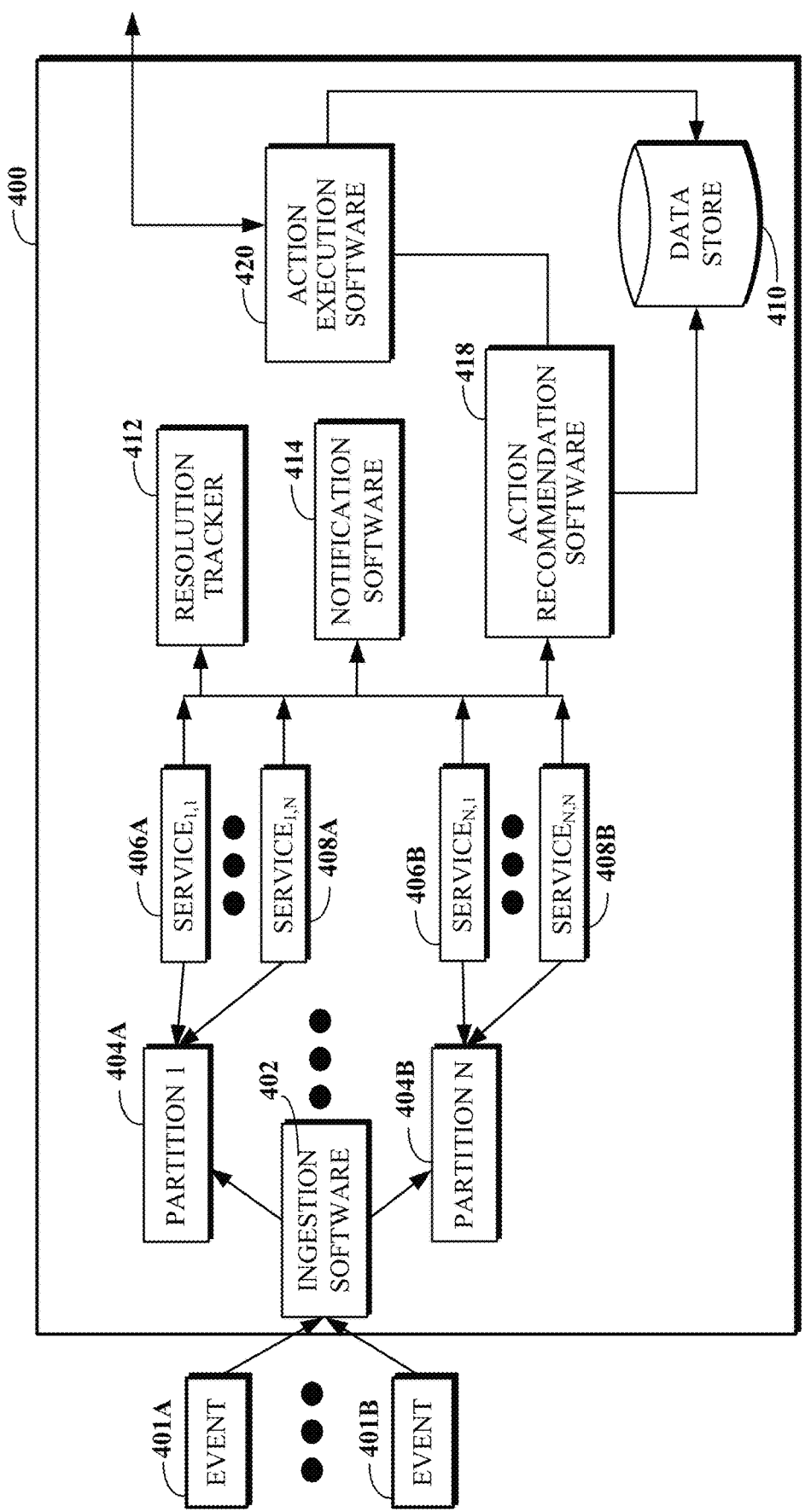
FIG. 4 illustrates a logical architecture of a system for action recommendations for operational issues.

FIG. 4 illustrates a logical architecture of a system 400 for action recommendations for operational issues (e.g., events). In at least one of the various embodiments, a system for action recommendations for operational issues may include various components. In this example, the system 400 includes an ingestion software 402, one or more partitions 404A-404B, one or more services 406A-406B and 408A-408B, a data store 410, a resolution tracker 412, a notification software 414, an action recommendation software 418, and an action execution software 420.

One or more systems, such as monitoring systems, of one or more organizations may be configured to transmit events to the system 400 for processing. The system 400 may provide several services. A service may, for example, process an event into an actionable item (e.g., an alert). As mentioned above, a received event may trigger an alert, which may trigger an incident, which in turn may cause notifications to be transmitted to responders.

A received event from an organization may include an indication of one or more services that are to operate on (e.g., process, etc.) the event. The indication of the service is referred to herein as a routing key. A routing key may be unique to a managed organization. As such, two events that are received from two different managed organizations for processing by a same service would include two different routing keys. A routing key may be unique to the service that is to receive and process an event. As such, two events associated with two different routing keys and received from the same managed organization for processing may be directed to (e.g., processed by) different services.

The ingestion software 402 may be configured to receive or obtain one or more different types of events provided by various sources, here represented by events 401A, 401B. The ingestion software 402 may accept or reject received events. In an example, events may be rejected when events are received at a rate that is higher than a configured event acceptance rate. If the ingestion software 402 accepts an event, the ingestion software 402 may place the event in a partition for further processing. If an event is rejected, the event is not placed in a partition for further processing. The ingestion software may notify the sender of the event of whether the event was accepted or rejected. Grouping events into partitions can be used to enable parallel processing and/or scaling of the system 400 so that the system 400 can handle (e.g., process, etc.) more and more events and/or more and more organizations.

The ingestion software 402 may be arranged to receive the various events and perform various actions, including, filtering, reformatting, information extraction, data normalizing, or the like, or combination thereof, to enable the events to be stored (e.g., queued, etc.) and further processed. In at least one of the various embodiments, the ingestion software 402 may be arranged to normalize incoming events into a unified common event format. Accordingly, in some embodiments, the ingestion software 402 may be arranged to employ configuration information, including, rules, templates, maps, dictionaries, or the like, or combination thereof, to normalize the fields and values of incoming events to the common event format. The ingestion software 402 may assign (e.g., associate, etc.) an ingested timestamp with an accepted event.

In at least one of the various embodiments, an event may be stored in a partition, such as one of the partition 404A or the partition 404B. A partition can be, or can be thought of, as a queue (i.e., a first-in-first-out queue) of events. FIG. 4 is shown as including two partitions (i.e., the partitions 404A and 404B). However, the disclosure is not so limited and the system 400 can include one or more than two partitions.

In an example, different services of the system 400 may be configured to operate on events of the different partitions. In an example, the same services (e.g., identical logic) may be configured to operate on the accepted events in different partitions. To illustrate, in FIG. 4, the services 406A and 408A process the events of the partition 404A, and the services 406B and 408B process the events of partition the 404B, where the service 406A and the service 406B execute the same logic (e.g., perform the same operations) of a first service but on different physical or virtual servers; and the service 408A and the service 408B execute the same logic of a second service but on different physical or virtual servers. In an example, different types of events may be routed to different partitions. As such, each of the services 406A-406-B and 408A-408B may perform different logic as appropriate for the events processed by the service.

An (e.g., each) event, may also be associated with one or more services that may be responsible for processing the events. As such, an event can be said to be addressed or targeted to the one or more services that are to process the event. As mentioned above, an event can include or can be associated with a routing key that indicates the one or more services that are to receive the event for processing.

Events may be variously formatted messages that reflect the occurrence of events or incidents that have occurred in the computing systems or infrastructures of one or more managed organizations. Such events may include facts regarding system errors, warning, failure reports, customer service requests, status messages, or the like. One or more external services, at least some of which may be monitoring services, may collect events and provide the events to the system 400. Events as described above may be comprised of, or transmitted to the system 400 via, SMS messages, HTTP requests/posts, API calls, log file entries, trouble tickets, emails, or the like. An event may include associated information, such as, source, a creation time stamp, a status indicator, more information, fewer information, other information, or a combination thereof, that may be tracked.

In at least one of the various embodiments, a data store 410 may be arranged to store performance metrics, configuration information, or the like, for the system 400. In an example, the data store 410 may be implemented as one or more relational database management systems, one or more object databases, one or more XML databases, one or more operating system files, one or more unstructured data databases, one or more synchronous or asynchronous event or data buses that may use stream processing, one or more other suitable non-transient storage mechanisms, or a combination thereof.

Data related to events, alerts, incidents, notifications, other types of objects, or a combination thereof may be stored in the data store 410. The data store 410 can include data related to resolved and unresolved alerts. The data store 410 can include data identifying whether alerts are or not acknowledged. With respect to a resolved alert, the data store 410 can include information regarding the resolving entity that resolved the alert (and/or, equivalently, the resolving entity of the event that triggered the alert), the duration that the alert was active until it was resolved, other information, or a combination thereof. The resolving entity can be a responder (e.g., a human). The resolving entity can be an integration (e.g., automated system), which can indicate that the alert was auto resolved. That the alert is auto resolved can mean that the system 400 received, such as from the integration, an event indicating that a previous event, which triggered the alert, is resolved. The integration may be a monitoring system. The data store 410 can include data related to actions performed with respect to alerts. The data store 410 can include data indicating whether an action cleared (or contributed to clearing) a triggering event, or equivalently, the event. The data store 410 can also include associations (i.e., action-component associations) between actions and IT components and associations (i.e., alert-to-component associations) between alerts (i.e., alert types) and IT components. These associations are further described below with respect to FIG. 5.

In at least one of the various embodiments, the resolution tracker 412 may be arranged to monitor details regarding how events, alerts, incidents, other objects received, created, managed by the system 400, or a combination thereof are resolved. In some embodiments, this may include tracking incident and/or alert life-cycle metrics related to the events (e.g., creation time, acknowledgement time(s), resolution time, processing time,), the resources that are/were responsible for resolving the events, the resources (e.g., the responder or the automated process) that resolved alerts, and so on.

The resolution tracker 412 can receive data from the different services that process events, alerts, or incidents. Receiving data from a service by the resolution tracker 412 encompasses receiving data directly from the service and/or accessing (e.g., polling for, querying for, asynchronously being notified of, etc.) data generated (e.g., set, assigned, calculated by, stored, etc.) by the service. The resolution tracker can receive (e.g., query for, read, etc.) data from the data store 410. The resolution tracker can write (e.g., update, etc.) data in the data store 410. The resolution tracker 412 can receive, and store in the data store 410, feedback data regarding whether actions performed with respect to alerts resolved or did not resolve the alerts.

While FIG. 4 is shown as including one resolution tracker 412, the disclosure herein is not so limited and the system 400 can include more than one resolution tracker. In an example, different resolution trackers may be configured to receive data from services of one or more partitions. In an example, each partition may have associated with one resolution tracker. Other configurations or mappings between partitions, services, and resolution trackers are possible.

The notification software 414 may be arranged to generate notification messages for at least some of the accepted events. The notification messages may be transmitted to responders (e.g., responsible users, teams) or automated systems. The notification software 414 may select a messaging provider that may be used to deliver a notification message to the responsible resource. The notification software 414 may determine which resource is responsible for handling the event message and may generate one or more notification messages and determine particular message providers to use to send the notification message.

In at least one of the various embodiments, a scheduler (not shown) may determine which responder is responsible for handling an incident based on at least an on-call schedule and/or the content of the incident. The notification software 414 may generate one or more notification messages and determine a particular message providers to use to send the notification message. Accordingly, the selected message providers may transmit (e.g., communicate, etc.) the notification message to the responder. Transmitting a notification to a responder, as used herein, and unless the context indicates otherwise, encompasses transmitting the notification to a team or a group. In some embodiments, the message providers may generate an acknowledgment message that may be provided to system 400 indicating a delivery status of the notification message (e.g., successful or failed delivery).

In at least one of the various embodiments, the notification software 414 may determine the message provider based on a variety of considerations, such as, geography, reliability, quality-of-service, user/customer preference, type of notification message (e.g., SMS or Push Notification, or the like), cost of delivery, or the like, or combination thereof. In at least one of the various embodiments, various performance characteristics of each message provider may be stored and/or associated with a corresponding provider performance profile. Provider performance profiles may be arranged to represent the various metrics that may be measured for a provider. Also, provider profiles may include preference values and/or weight values that may be configured rather than measured.

In at least one of the various embodiments, the action recommendation software 418 identifies actions to propose to a responder for resolving an alert. The action recommendation software 418 uses the action-component associations and the alert-to-component associations to identify the actions. The identified actions can be presented to the responder in a user interface of (e.g., generated by) the system 400. The action recommendation software 418 implements or uses learning algorithm to refine its action identifications. The learning algorithms can refine the action identifications using the actions selected by the responders and whether those actions actually resolved or contributed to resolving, are inferred to have resolved or contributed to resolving alerts. Refining the action recommendation includes that, over time, and as more responders select actions to perform, the system 400 learns to provide more accurate action recommendation to the responders. The action recommendation software 418 is further described with respect to FIG. 5.

In at least one of the various embodiments, the system 400 may include various user-interfaces or configuration information (not shown) that enable organizations to establish how events should be resolved. Accordingly, an organization may define, rules, conditions, priority levels, notification rules, escalation rules, routing keys, or the like, or combination thereof, that may be associated with different types of events. For example, some events may be informational rather than associated with a critical failure. Accordingly, an organization may establish different rules or other handling mechanics for the different types of events. For example, in some embodiments, critical events may require immediate (e.g., within the target lag time) notification of a response user to resolve the underlying cause of the event. In other cases, the events may simply be recorded for future analysis. For example, an organization may configure one or more services to auto-pause incident notifications (or, equivalently, to auto-pause alerts).

The action execution software 420 may receive actions selected by a responder from the action recommendation software 418. The action execution software 420 may include facilities (e.g., tools, software, utilities, or the like) for transmitting the actions to, or causing the actions to be carried out by, IT components in the managed environments. For at least some of the actions, the IT components in the managed environments may return data (e.g., feedback data) to the action execution software 420 indicating whether the actions were successful or other status data. That data is returned to the action execution software 420 includes that the data are received by the resolution tracker 412, which stores the data in the data store 410, and those data used (e.g., retrieved) by the action execution software 420 from the data store 410. The action execution software 420 may store such status data in the data store 410. For example, the action execution software 420 may store status data in association with corresponding actions and the alerts for which the actions were performed. Such associations may be used by learning algorithms of the action recommendation software 418.

Figure 5:
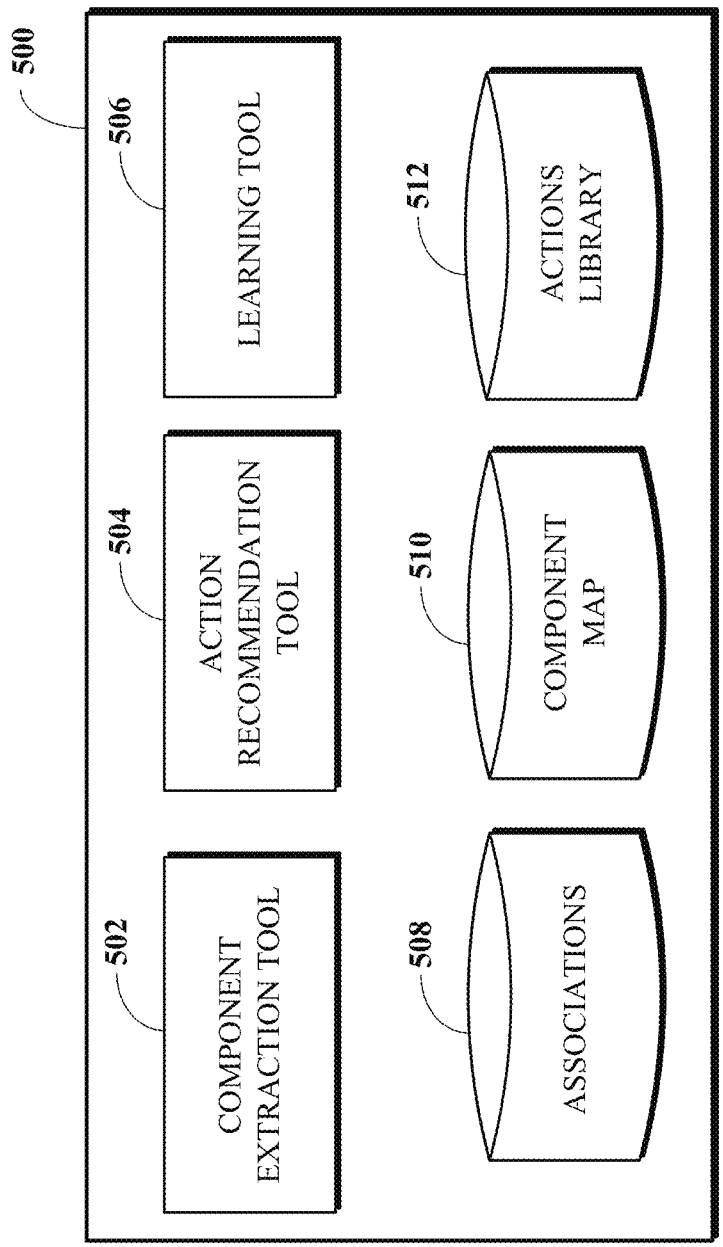
FIG. 5 is a block diagram of example functionality of an action recommendation software.

FIG. 5 is a block diagram of example functionality of an action recommendation software 500. The action recommendation software 500 can be the action recommendation software 418 of FIG. 4. The action recommendation software 500 includes tools, such as programs, subprograms, functions, routines, subroutines, operations, executable instructions, and/or the like for, inter alia and as further described below, identifying (i.e., recommending) actions to be performed for resolving alerts. The identified (i.e., recommended) actions may be presented to a responder. The identified actions may be presented in a sorted order according to a likelihoods of resolving alerts. The responder may select one or more of the identified actions or some other actions (i.e., actions not identified by the action recommendation software 500) to resolve the alert. By selecting an action to resolve an alert, a responder may have at least some level of belief in that the action, when executed, would resolve the alert.

At least some of the tools of the action recommendation software 500 can be implemented as respective software programs that may be executed by one or more network computer, such as the network computer 300 of FIG. 3. A software program can include machine-readable instructions that may be stored in a memory such as the processor-readable stationary storage device 334 or the processor-readable removable storage device 336 of FIG. 3, and that, when executed by a processor, such as processor 302, may cause the network computer to perform the instructions of the software program.

As shown, the action recommendation software 500 includes a component extraction tool 502, an action recommendation tool 504, and a learning tool 506. In some implementations, the action recommendation software 500 can include more or fewer tools. In some implementations, some of the tools may be combined, some of the tools may be split into more tools, or a combination thereof. For example, each of the component extraction tool 502 and the action recommendation tool 504 may include or implement respective learning tools or algorithms. The action recommendation software 500 is shown as including an associations data store 508, a component map 510, and an actions library 512, any of which may be included in the data store 410 of FIG. 4.

The associations data store 508 can store associations between IT components and alerts (i.e., alert-to-component associations). An association between an IT component and an alert indicates that the alert may have been triggered by the IT component or that the IT component may be a cause of the alert (e.g., a cause of the event that triggered the alert). To be more specific, an association between an alert and an IT component means an association between features indicative of the alert and the IT component. The features indicative of an alert may be referred to as a type of alert. Thus, associating an alert with an IT component can mean associating an alert type of the alert with the IT component. As more than one alert and may have the same features, the more than one alert can be said to be associated with the IT component.

Alerts may be processed to map to alert types. Configuration information, including, rules, templates, maps, dictionaries, or the like, or combination thereof (collectively, normalization rules) to normalize fields and values of alerts to alert types. By normalizing alerts, similar alerts can be identified.

To illustrate, and without limitations, assume that normalization rules are applied alert titles and that a first alert has a first title of "CRITICAL—code 10—Nodejs on 10.168.10.2 unavailable for http://www.server.com/service1" and a second alert has a second title of "CRITICAL—code 123—Nodejs on 132.68.145.12 unavailable for https://internal.sl.com/index.html". The first and the second titles do not match without further text processing. However, as further described herein, the first and the second titles may be normalized to the same normalized title "critical code x nodejs on ip unavailable for uri." As such, for purposes of IT component extraction, the first alert and the second alert can be considered to be similar, equivalent, or of the same type.

Table I illustrates examples of the text processing rules that may be applied to an alert title to obtain a normalized title. In some implementations, more, fewer, other rules, or a combination thereof may be applied. In an example, the rules may be applied in a predefined order. For example, the rules of Table I may be applied in the order listed in Table I. However, it is noted that in the following explanation of the rules of Table I, each rule is considered in isolation and independently of any other rules.

TABLE I

| Order | Rule |
|---|---|
| 1 | Remove any newlines, and tab spaces and split alert summaries on white spaces. |
| 2 | Replace date, datetime, and time strings with a placeholder token (e.g., "datetime"). |

TABLE I-continued

| Order | Rule |
|---|---|
| 3 | Replace identifiers with representative tokens. |
| 4 | Replace camel casing with spaces. |
| 5 | Replace numeric characters with a placeholder token (e.g. "X"). |
| 6 | Convert the title to a single case. |
| 7 | Replace email addresses with a placeholder token (e.g., "email_adr"). |
| 8 | Replace punctuation characters with spaces. |
| 9 | Replace multiple consecutive white spaces with a single whitespace. |

Rule 1, when applied to an alert title, removes any new lines, table spaces, and the like, and replaces multiple consecutive white spaces with a single whitespace. Rule 2, when applied to an alert title, identifies any substring that may indicate a time (e.g., a date, a timestamp, a date and time) and replaces the time with the token (e.g., string) "datetime." For example, given the title "Jan 31, 2021 10:35:34—Service unavailable," rule 2 results in the normalized title "datetime—Service unavailable." Rule 3 identifies special identifiers in the alert title and replaces the identifiers with respective representative tokens. To illustrate, and without limitations, Rule 3 may identify, in an alert title, a substring (e.g., an identifier) as a universally unique identifier (UUID), a globally unique identifier (GUID), an Internet Protocol (IP) address, or a Uniform Resource Locator (URL) and replaces such identifiers with the representative tokens "uuid," "uuid," "ip_addr," or "url," respectively. For example, given the alert title "sparkline-replay-pixel_10_108_91_19 expired," rule 3 obtains the normalized title "sparkline-replay-pixel_ip_addr expired."

Rule 4, when applied to an alert title, converts camel casing to spaces. Camel casing refers to writing phrases without spaces or punctuation and indicating the separation of words with a single capitalized letter. For example, given the alert title "Sum RunningTaskCount LessThan 3.0," rule 4 may obtain the normalized title "Sum Running Task Count Less Than 3.0."

Rule 5, when applied to an alert title, replaces a numeric substring with a uniform non-numeric substring of the same length as the numeric substring. As such, rule 5 removes numbers while maintaining the length of the alert title. For example, given the alert title "HTTP error 504," rule 5 obtains the normalized title "HTTP error XXX." In another variation of rule 5, a numeric substring may be replaced with a single predetermined, non-numeric character. As such, the normalized title "HTTP error X" may instead be obtained.

Rule 6, when applied to an alert title, converts the alert to a single case (e.g., one of capital letters or lower-case letters). For example, given the alert title "Sum Running Task Count LESS THAN 3.0," rule 6 may be applied to convert the title to the lower-case title "sum running task count less than 3.0." Rule 7, when applied to an alert title, replaces email addresses with a placeholder token, such as the token "email_adr." For example, given the alert title "unknown 552 <jack@example.com> Mailbox full," rule 7 obtains the normalized title "unknown 552 email_adr Mailbox full."

Rule 8, when applied to an alert title, replaces punctuation characters (e.g., underscores, square brackets, plus signs, question marks, parentheses, curly brackets, semi-colons, commas, periods, question marks, etc., or a subset thereof) with spaces. For example, given the alert title "kubernetes—Watchdog [prod-westus]," rule 8 obtains the normalized alert title "kubernetes Watchdog prod westus." Rule 9 replaces multiple consecutive white spaces with a single whitespace character and removes any leading or trailing white spaces. For example, given the string "kubernetes Watchdog prod westus," rule 9 obtains the normalized title "kubernetes Watchdog prod westus."

The rules of Table I may be implemented in any number of ways. For example, each of the rules may be implemented as a respective set of computer executable instructions (e.g., a program, etc.) that carries out the function of the rule. At least some of the rules may be implemented using pattern matching and substitution, such as using regular expression matching and substitution. Other implementations are possible.

Each alert-to-component association can have (e.g., can be associated with) a likelihood (i.e., an alert-to-component likelihood). The alert-to-component likelihood between an alert and an IT component indicates the level of confidence (e.g., certainty or probability) that the IT component triggered the alert or that an action associated with IT-component can at least partially resolve the alert. A likelihood can be indicative of a number of times that an action associated with the IT component was selected for resolving the alert and that the action successfully resolved (or is at least inferred to have resolved) the alert. Thus, the learning algorithms described herein can be used to increase or decrease the likelihoods to reflect patterns of action selections by responders.

In an example, the alert-to-component likelihoods may be calculated (e.g., updated) by the learning tool 506 and stored in the associations data store 508. In another example, the alert-to-component likelihoods may not be explicitly stored in the associations data store 508. Instead, a machine learning models that is trained using the learning tool 506, can be used to output respective alert-to-component likelihoods for at least some of the IT components stored in the actions library 512. The machine learning model may receive an alert and output respective alert-to-component likelihoods. Receiving the alert can include receiving the alert itself (from which the machine learning model extracts features), receiving features extracted from the alert, or a combination thereof.

The associations data store 508 can also store associations between alerts and actions (i.e., action-to-alert associations). An association between an action and an alert indicates that the action may resolve (or may partially resolve) the alert. To be clear, that an action may resolve an alert means that the action may clear the event that triggered the alert. Each action-to-alert association can have (e.g., can be associated with) a likelihood (i.e., an action-to-alert likelihood). The action-to-alert likelihood between an action an alert indicates the level of confidence (e.g., certainty or probability) that the IT action would resolve the alert. The likelihood can be indicative of a number of times that the action was selected for the alert and the action successfully resolved (or is at least inferred to have resolved) the alert.

The component extraction tool 502 identifies (e.g., extracts based on an alert) one or more IT components that may be associated with an alert. The extracted IT components may be those that triggered the alert. The extracted IT components may not necessarily be those that actually triggered (e.g., caused) the alert but those that actions performed thereupon may resolve the alert. To illustrate, an alert may indicate degraded response from an application named spotlight (e.g., a first IT component). An action to reboot a load balancer (e.g., a second IT component) that routes requests to the application may resolve the alert. As such, the extracted IT component (e.g., the second IT component) may not be the IT component (e.g., the first IT component) that caused the alert. The component extraction tool 502 may store alert-to-component associations in the associations data store 508. The component extraction tool 502 or the learning tool 506 may update alert-to-component likelihoods as described below.

The component extraction tool 502 may initially identify IT components using data associated with the alert itself and heuristics therefor. However, the learning tool 506 can be used to improve (e.g., evolve) the IT component identification capabilities of the component extraction tool 502 based on the actions selected by responders and indications whether the actions were successful in resolving alerts. Improving IT-component identification can mean increasing alert-to-component likelihoods. That is, the confidence that an identified IT component is the correct IT component of an alert increases based on increased selections by responders of actions associated with the IT component and where those actions contribute to resolving the alert. As mentioned above, a correct IT component for an alert is an IT component an action executed thereupon at least partially resolves the alert. As the confidence increases in certain alert-to-component associations, the component extraction tool 502 becomes less reliant on the heuristics and more reliant on those associations.

The IT components may be initially identified in any data associated with the alert (e.g., alert data). For example, IT components may be identified in a title of an alert, a payload (e.g., a long description) of an alert, metadata of the alert, a service that processed the alert, a routing key associated with the alert, a class of the alert, or any other data associated with the alert. In an example, the component extraction tool 502 may be configured with heuristics to extract IT components based on their industry names, accepted or common abbreviations, nicknames, or the like (collectively, IT component descriptors). For example, the component extraction tool 502 may be configured to identify various cloud-based services, open-source libraries or frameworks, common commercial IT components, and the like. The component extraction tool 502 may include or have access to the component map 510, which includes mappings from IT component descriptors to IT components.

To illustrate, the component extraction tool 502 may be configured to recognize, using heuristics, that alerts that include the substrings "AWS ES," "GCLB," "EC2," and "k8s" (and/or "kube") refer, respectively, to the IT components Amazon Elasticsearch Service, Google Cloud Load Balancer, Amazon's Elastic Compute, and Kubernetes. Additionally, the component extraction tool 502 may be configured to recognize custom IT components. To illustrate, a managed organization may have developed and deployed in its managed IT environment a custom application that calculates the monthly salaries of executive management personnel. Monitoring tools of the executive pay application may transmit events to the EMB that include the application nickname ExaPay.

Given an alert, the action recommendation tool 504 identifies (e.g., recommends) actions for resolving the alert based on the IT component(s) identified by the component extraction tool 502. The actions may be presented to a responder as recommended actions for resolving the alert. The recommended actions may be presented to the responder in a list. The list may be ordered based on action-to-alert likelihoods. The action recommendation tool 504 may access the actions library 512 to identify actions. As such, the actions library 512 can include mappings from IT components to recommended actions. The actions library 512 can include (e.g., configured to include) actions that can be performed. At least some of the actions may be associated with IT components. That is, some actions may not be associated with specific IT components. Some actions may be associated with more than one IT component.

Initially (e.g., prior to any selection by responders of actions for resolving alerts, in the initial state of the action recommendation software 500, or until association likelihoods that meet likelihood thresholds are available), the action recommendation software 500 may not include any action-to-alert associations and action-to-alert likelihoods. When an action-to-alert association is added to the associations data store 508 and its action-to-alert likelihood may be set to an initial value. The action-to-alert likelihood can be updated by the learning tool 506, as further described below.

The learning tool 506 can include one or more techniques for improving IT component extraction and one or more techniques for improving action recommendation. The learning techniques can collect and use data related to at least two aspects related to executed actions; namely, which actions were executed (e.g., data regarding actions selected for execution) and whether or not the executions led alert resolution (e.g., data regarding action execution). With respect to the data regarding actions selected for execution, the collected data can include one or more of number of times that actions were recommended; number of times that actions were selected by responders; if responders selected recommended actions, the IT components associated with those actions; if responders did not select recommended actions, the actions executed by the responders and the IT components associated with those actions. With respect to the data regarding action execution, the collected data can include whether an action executed successfully, and whether action execution led to a subsequent action or to resolution of the alert. That is, if a responder chose an action for execution with respect to an alert, what was the immediately succeeding step that the responder took: was the next step a selection of another action to execute or was the next step a resolution of the alert.

Improving component extraction includes identifying IT components based on alert data. The alert data of an alert can include the history of selecting actions associated with IT components to resolve the alert. Improving component extraction can also include adjusting alert-to-component likelihoods.

In an example, topic modeling techniques can be used to identify associations between IT components and alerts. Topic modeling machine learning techniques can be used to associate salient features of alerts with IT components. The machine learning techniques can extract salient features that are indicative or predictive of particular IT components with respect to certain alerts. Thus, a trained machine learning model can receive alert data and output one or more IT components and respective alert-to-component likelihoods.

In an example, Natural Language Processing (NLP) techniques and models can be used to obtain the alert-to-component likelihoods. For example, an NLP technique can be used to extract tokens related to IT components from alert data (e.g., the alert payload). In an example, the NLP used can be or include a Bidirectional Encoder Representations from Transformers (BERT) model for obtaining the alert-to-component likelihoods. The BERT model can be used to determine the extent to which an IT component is related to an alert. As is known, a BERT model can be pre-trained on a large data set (e.g., including alerts and alert payloads) and then fine-tuned for another purpose (e.g., probabilistically associating IT components with alerts) using a more specific dataset. The BERT model can be fine-tuned to output alert-to-component likelihoods corresponding to the extent to which IT components are appropriate (e.g., are related to) alerts.

Figure 6:
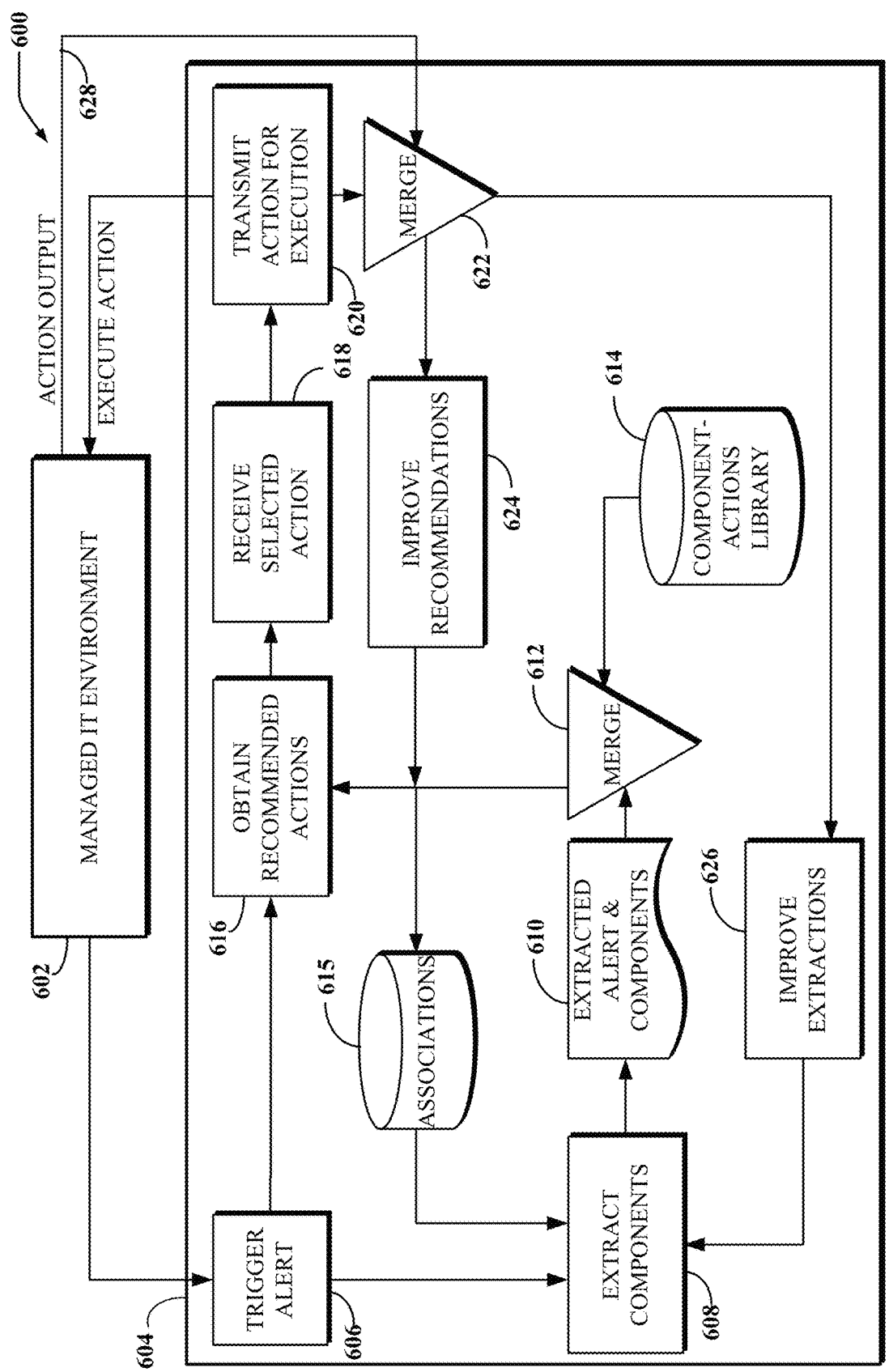
FIG. 6 is an example of a flow diagram of a technique for action recommendations for operational issues.

To further describe some implementations in greater detail, reference is next made to examples of techniques which may be performed for augmenting a foreground portion of images of a conference participant. FIG. 6 is an example of a flow diagram of a technique 600 for action recommendations for operational issues. The technique 600 can be executed using computing devices, such as the systems, hardware, and software described with respect to FIGS. 1-5. FIG. 6 is shown as including a managed IT environment (i.e., IT environment 602) that includes IT components (not shown) and an EMB 604, which can be the system 400 of FIG. 4. The EMB 604 implements functionality that is described with respect to FIG. 5. The technique 600 may be implemented in whole or in part by an action recommendation software, such as the action recommendation software 500 of FIG. 5.

At 606, an alert is triggered responsive to an event received from the IT environment 602. The event may be received from a monitoring tool of the IT environment 602. Triggering an event can mean creating an alert object corresponding to the event. As described above, the event may first be received by an ingestion software, such as the ingestion software 402 of FIG. 4. The alert may be assigned to a responder.

At 608, IT components that may be associated with the alert are extracted, such as by a component extraction tool, which may be the component extraction tool 502 of FIG. 5. Using the alert, the component extraction tool may query an associations data store 615, which can be the associations data store 508 of FIG. 5, to determine whether any alert-to-component associations have likelihoods that exceed an alert-to-component likelihood threshold. In another example, and as described above, alert-to-component likelihoods may not explicitly stored in a data store. Rather, the alert-to-component associations that have likelihoods that exceed the alert-to-component likelihood threshold may be obtained from a machine learning model, that can be as described above. If no alert-to-component associations for which alert-to-component likelihoods exceed the threshold are found, then the component extraction tool may use configured rules (e.g., heuristics) to identify the IT components based on the alert data. The output is the alert and a set of extracted components 610. More specifically, the alert itself is passed (not extracted per se) along with the extracted components to the next phase(s) of processing, as described herein.

At 612, the extracted alert and IT components 610 are merged with a component-actions library 614, which may be the actions library 512 of FIG. 5, to obtain a set of recommended actions to be presented to the responder at 616. The steps 608 and 612 may be performed at any time between the event being triggered and the presenting of the actions to the responder at 616. The recommended actions can be those actions associated with the extracted IT components and having action-to-alert likelihoods that are greater than an action-to-alert likelihood threshold. In an example, if no such action-to-alert associations have action-to-alert likelihoods that are greater than the action-to-alert likelihood threshold, then the recommended actions can be those actions associated with the IT component in the component-actions library 614.

In an example, the technique 600 may be configured to obtain a predetermined number of recommended actions at 616. As such, if a number of actions identified based on the action-to-alert likelihoods is less than the predetermined number of actions, then additional actions can be obtained from the component-actions library 614. In an example, the additional actions can be randomly selected from the actions associated with the identified IT component.

In an example, the recommended actions are obtained on demand. That is, the steps 608 and 612 may be performed in response to the responder accessing a user interface of the EMB 604 that allows the responder to choose one or more actions to execute. In another example, the steps 608 and 612 may be performed (or may be scheduled to be performed) in response to the alert being triggered. As such, the recommended actions may be obtained and cached in the EMB 604 for presentation at 616.

The steps 608-616 can be summarized as identifying actions in the component-actions library 614 that are likely to lead to resolution of an alert based on a combination of the alert data and the IT component. The actions can be ordered according to their respective likelihoods of resolving the alert. In an example, the likelihoods of actions can be used to recommend to the responder the most likely action to lead to resolution. If an insufficient number of actions is identified based on action-to-alert likelihoods, then alert data (e.g., alert title or payload) can be used to identify substrings that map to particular IT components.

At 618, a selected (e.g., chosen) action from the set of recommended actions is received, such as from the responder. As mentioned, the recommended actions may be presented to the responder and the responder can select one or more of the recommended actions. The recommended actions may be displayed to the responder in reverse action-to-alert likelihoods. That is, the recommended actions corresponding to higher action-to-alert likelihoods are listed before actions corresponding to lower action-to-alert likelihoods.

At 620, the selected action(s) is(are) transmitted to the IT environment 602 for execution. As mentioned, an action can be transmitted to an IT component (which may or may not be the same IT component that triggered the alert) for execution. As also mentioned, an action may be a set of manual steps (rather than, for example, an automated script or the like) that may be performed by the responder or other human operators. As such, transmitting the action for execution at 620 encompasses any way of having the actions performed in the IT environment 602, whether via manual steps, automated steps, or a combination thereof.

A result of performing an action in the IT environment 602 is obtained at 622. The result can include whether the action was successful (or was helpful) in resolving the alert. For example, when an alert is resolved in response to multiple actions being executed, then any one of the actions may be considered to be helpful in resolving the alert. That is, the action may be considered to partially resolve the alert. Whether an action resolved or partially resolved (collectively, resolved) an alert may be determined explicitly or implicitly using feedback data.

In an example of explicit feedback data, the responder may be prompted to input whether the action resolved (or partially resolved) the alert. For example, the responder may use a user interface of the EMB 604 to resolve an alert. The user interface may list actions (e.g., a chain of actions) executed to resolve the alert. The responder may indicate, for at least some of the actions, whether the actions resolved the alert. In another example of explicit feedback data, the result (e.g., output) of the action (e.g., action output 628) may itself include signals (e.g., data) indicating whether the alert was resolved.

In an example of implicit feedback data, the technique 600 may imply that the action resolved the feedback based on the responder resolving the alert (e.g., receiving an input from the responder to set the state of the alert object to "resolved."). In an example, if no other actions were selected with respect to the alert, and the responder resolved the alert, then it can be inferred that the alert was resolved because of the action. In another example, if the elapsed time between a first time that the responder selected an action for execution and a second time that the responder resolved the alert is under a threshold amount of time (e.g., 5 minutes, 10 minutes, or some other time), then it can be inferred that the action resolved the alert. In another example, if the responder choses any additional actions to execute between one action and an alert being resolved, then it can be inferred that the one action was not successful in resolving the alert.

In the case of implicit feedback, the technique 600 may not be able to infer with complete certainty that the action was indeed the reason that the alert was resolved. However, implicit feedback data received with respect to (e.g., based on the execution of) many actions and corresponding alerts can be used by the learning algorithms to update the action-to-alert likelihoods.

The result may be merged with the action and alert and the technique 600 proceeds to 624 and 626. Learning algorithms may be used at 624 and 626 to improve, respectively, action recommendations and IT component extraction (e.g., identification) from alerts. That is feedback data may be used by the learning algorithms to improve the action recommendations and IT-component extraction. The learning algorithms may be executed at predefined frequencies (e.g., daily, weekly, etc.), after receiving a predefined amount of new feedback data (e.g., after executing 450 actions), according to some other criteria, or a combination thereof.

The learning algorithms used at 624 and 626 can collect and use several signals, which may also be referred to as features. To illustrate the result of improving IT-component extraction at 626, assume that alerts (and events triggered therefrom) may not include any explicit data that can be used to identify the IT components impacted. As such, extracting components at 608 may initially not identify any IT components. However, as responders select actions (over time) and feedback data identifies actions that resolved alerts, and as actions are organized by IT-component (as described with respect to actions library 512 of FIG. 5), then the action recommendation tool 504 can evolve to associate IT components with the alerts. Said another way, since actions are organized (e.g., grouped) by IT component, an execution of an action associated with a particular IT component can be a signal that the alert was related to that IT component. As such, a mapping of the affected IT components for each alert can be established even when the alert data does not explicitly contain the IT components.

As another, and more concrete illustration, the EMB 604 may be configured to receive alerts related to the IT component AWS Redshift cluster. As is known, Redshift is a data warehouse product that is part of the cloud-computing platform Amazon Web Services. The component-actions library 614 may be configured to associate two actions with the AWS Redshift component: a cluster resize action and a cluster reboot action. The cluster resize action, which can be used to increase the compute power of the cluster, may be a parametrized action given by the command aws redshift resize-cluster --cluster-identifier <mycluster> --cluster-type <multi-node> --node-type <dc2.large> --number-of-nodes <6> --classic. The cluster reboot action may be a parametrized action given by the command aws redshift reboot-cluster --cluster-identifier <mycluster>. The cluster resize action and the cluster reboot action may be executed using a command line interface (CLI) provided by the AWS Redshift component. Assume further that the component-actions library 614 includes a third action (i.e., the action described above) associated with an IT component named MyProgram and given by the parametrized command: ssh root@<server> "ps -ef|grep <ProcessName>|grep -v grep|awk '{print $2}'"|xargs kill -15.

In response to receiving events indicating that AWS Redshift clusters are under heavy loads, an action recommendation software of the EMB 604 (such as the component extraction tool 502 of FIG. 5) may initially identify "AWS Redshift" in the triggered alerts and present both of the associated actions (i.e., the cluster resize action and the cluster reboot action) to responders. In some situations, the responders may have selected one of these recommended actions and in some other situations, the responders selected the third action, which was not initially recommended and is not related to the AWS Redshift component in the actions library 514. Assume further (as described with respect to feedback data) that 10% of the times the cluster resize action led to alert resolutions, that 40% of the times the cluster reboot action led to alert resolutions, and that 50% of the times the third action led to alert resolutions. Assume further that the alert-to-component likelihood threshold is 35%. As such, IT component extraction (at 608) evolves (e.g., is improved at 626) to associate (via an alert-to-component association) alerts regarding AWS Redshift clusters being under heavy loads with the third action. Additionally, action recommendation is improved so that, at 616, the list of recommended actions includes the third action followed by the cluster reboot action (in this order) and to stop recommending the cluster resize action.

As yet another illustration, assume that a monitoring tool of the IT environment 602 sends events to the EMB 604, from which alerts are triggered, when disk space used by the IT component named Sales Data Warehouse and nicknamed SADAWA. Alerts having title formats such as "Average PercentageDiskSpaceUsed GreaterThanOrEqualToThreshold <NUMBER> for SADAWA" may be triggered. For simplicity, the IT component affected (i.e., SADAWA) is directly listed in the title. However, as already mentioned, the IT component may be obtained based on any alert data. At 608 (which may be performed by an component extraction tool, such as the component extraction tool 502 of FIG. 5) extracts the IT component from any alert data. Assume that the component-actions library 614 includes the actions modify_cluster and resize cluster for the SADAWA IT component.

Assume that based on the action-to-alert likelihoods, the top action recommendation is the modify_cluster action. However, the responder chooses the second action in the list, namely, the resize_cluster action. As such, the learning algorithms can detect that the recommendation was not quite perfect for this alert. With many such examples, the recommendations can be improved. In this case, the IT component was probably correctly identified since the responder selected an action that is associated with the IT component. Whether the action selected is associated with the identified IT component can be a signal that is used by the learning algorithms. Additionally, if feedback data indicates that the alert was resolved by the selected action, then the feedback data would constitute another signal that the IT component was correctly extracted.

As yet another illustration, assume that an alert with the title Sum ConsumedReadCapacityUnits GreaterThanOrEqualToThreshold <NUMBER> for TableName <*> was triggered and that the technique 600 recommended the resize cluster action for AWS Redshift IT component described above. Assume further that a responder in this scenario ignores the recommended action associated with the AWS Redshift IT component and, instead, chooses to execute an action update_table associated with a JumboDB IT component, which may be a NoSQL database service. As such, the learning algorithms can use this as a signal that the component extraction was incorrect in this scenario and can use the IT component (i.e., JumboDB) associated with the action (i.e., update_table) selected by the responder to improve the IT component extraction.

In some implementations, the technique 600 can receive indicators (e.g., requests) from responders to automatically execute actions (i.e., to execute actions without manual intervention or manual selection). That is the EMB 604 may be directed to remember an action selected by a responder for a particular alert-to-component association and create an association rule to automatically execute the action when a similar alert is triggered. Accordingly, the component-based techniques described herein for action recommendation and execution help build trust in the EMB 604 so that responders feel confident in letting the EMB 604 take actions without manual oversight.

Figure 7:
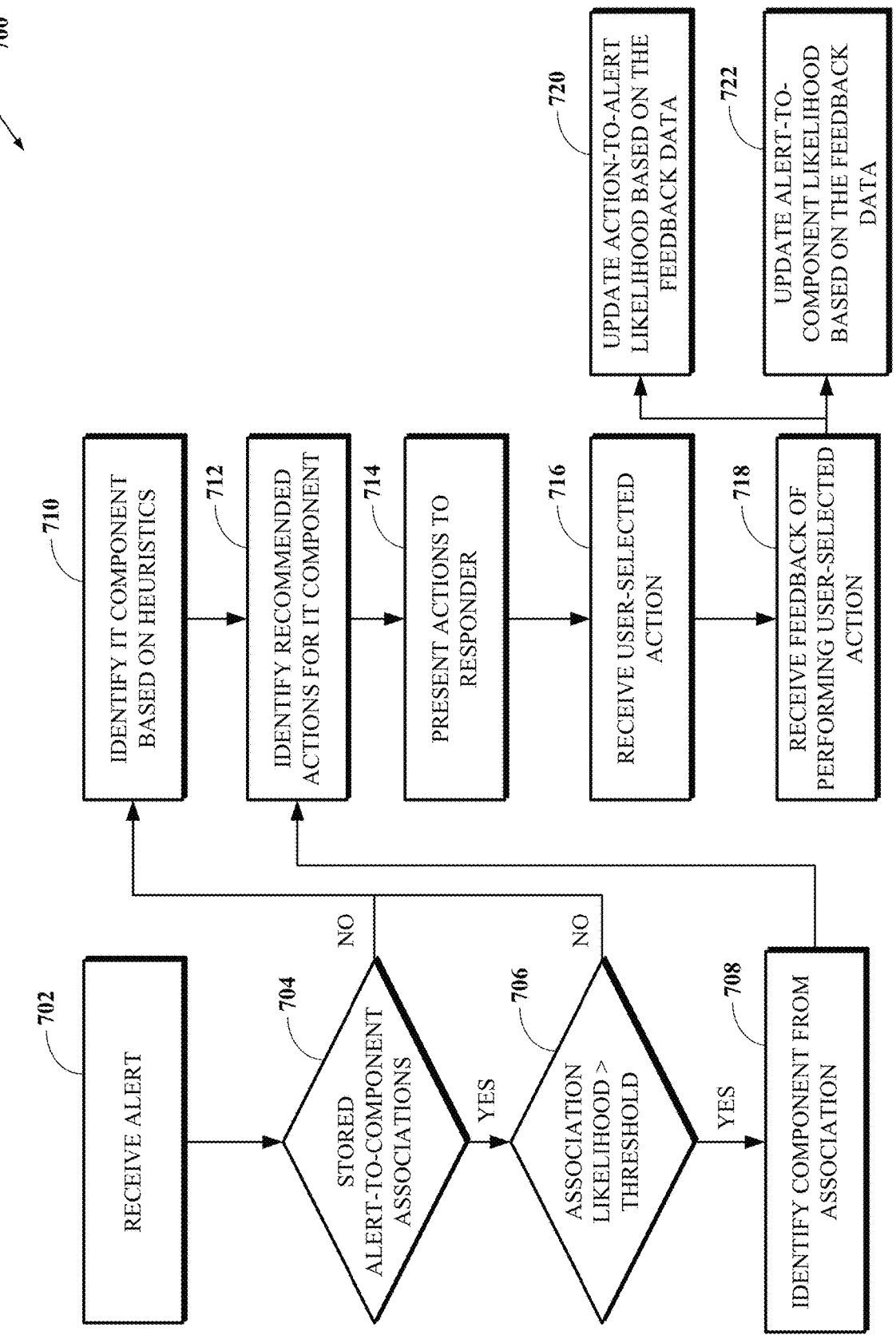
FIG. 7 is an example of a flowchart of a technique for identifying IT components and recommended action from alerts.

FIG. 7 is an example of a flowchart of a technique 700 for identifying IT components and recommended actions from alerts. The technique 700 can be executed using computing devices, such as the systems, hardware, and software described with respect to FIGS. 1-6. The technique 700 can be implemented in or by an EMB, such as the system 400 of FIG. 4. The technique 700 may be implemented in whole or in part in or by the action recommendation software 418 of the system 400 of FIG. 4 or the action recommendation software 500 of FIG. 5. The technique 700 can be implemented, for example, as a software program that may be executed by computing devices such as the network computer 300 of FIG. 3. The software program can include machine-readable instructions that may be stored in a memory (e.g., a non-transitory computer readable medium), such as the memory 304, the processor-readable stationary storage device 334, or the processor-readable removable storage device 336 of FIG. 3, and that, when executed by a processor, such as the processor 302 of FIG. 3, may cause the computing device to perform the technique 700. The technique 700 can be implemented using specialized hardware or firmware. Multiple processors, memories, or both, may be used.

At 702, an alert is received. The alert may be triggered responsive to an event in a managed environment. Triggering an event can mean creating an alert object, or the like, corresponding to the event. At 704, the technique 700 determines whether alert-to-components exist in a data store, such as the associations data store 508 of FIG. 5. The technique 700 uses the alert to determine whether associations exist. Using the alert to determine whether associations exist includes using an alert type or alert features to determine whether associations exist. If no associations exist, the technique 700 proceeds to 710. If associations exist (i.e., identified alert-to-component associations), the technique 700 proceeds to 706.

At 706, the technique 700 determine whether any identified alert-to-component associations have alert-to-component likelihoods that exceed an alert-to-component likelihood threshold. If so, the technique 700 extracts the IT components from such associations. At 710, the technique 700 identifies IT components from the alert based on heuristics, as described above. At 712, recommended actions are identified for the identified IT component. As described above, the recommended actions can be identified based on action-to-alert likelihoods meeting an action-to-alert likelihood threshold. If no such actions exist, then the recommended actions may be any actions that are grouped by the IT component according to a configuration. That actions are grouped by the IT component means that the actions can be applied to (e.g., invoked on) or are associated with the IT component regardless of whether they resolve any particular alert. That is, the grouping (e.g., association) of action to IT component is not in the context of any alerts.

At 714, the recommended actions are presented to a responder. At 716, the technique 700 receive a user-selected action. The responder may choose one of the recommended actions or may choose an action that is not recommended by the technique 700. The user-selected action may be performed (not shown). At 718, the technique 700 receives feedback data regarding the result of execution of the user-selected action. At 720, the action-to-alert likelihood is updated based on the feedback data. For example, the action-to-alert likelihood is updated based on whether the action resolved the alert. At 722, the alert-to-component likelihood is updated based on the feedback data. In an example, the action-to-alert likelihood, the alert-to-component likelihood, or both may be updated using the specific feedback data. In another example, feedback data corresponding to performing many actions may be accumulated and learning algorithms may be used to update the likelihoods based on the accumulated feedback data.

In an example, the steps 704-708 may be combined. For example, a machine learning model may be trained to receive alert data and output IT components that meet the alert-to-component likelihood threshold. Alternatively, the machine learning model may be trained to output for each possible IT component a corresponding likelihood score.

Figure 8:
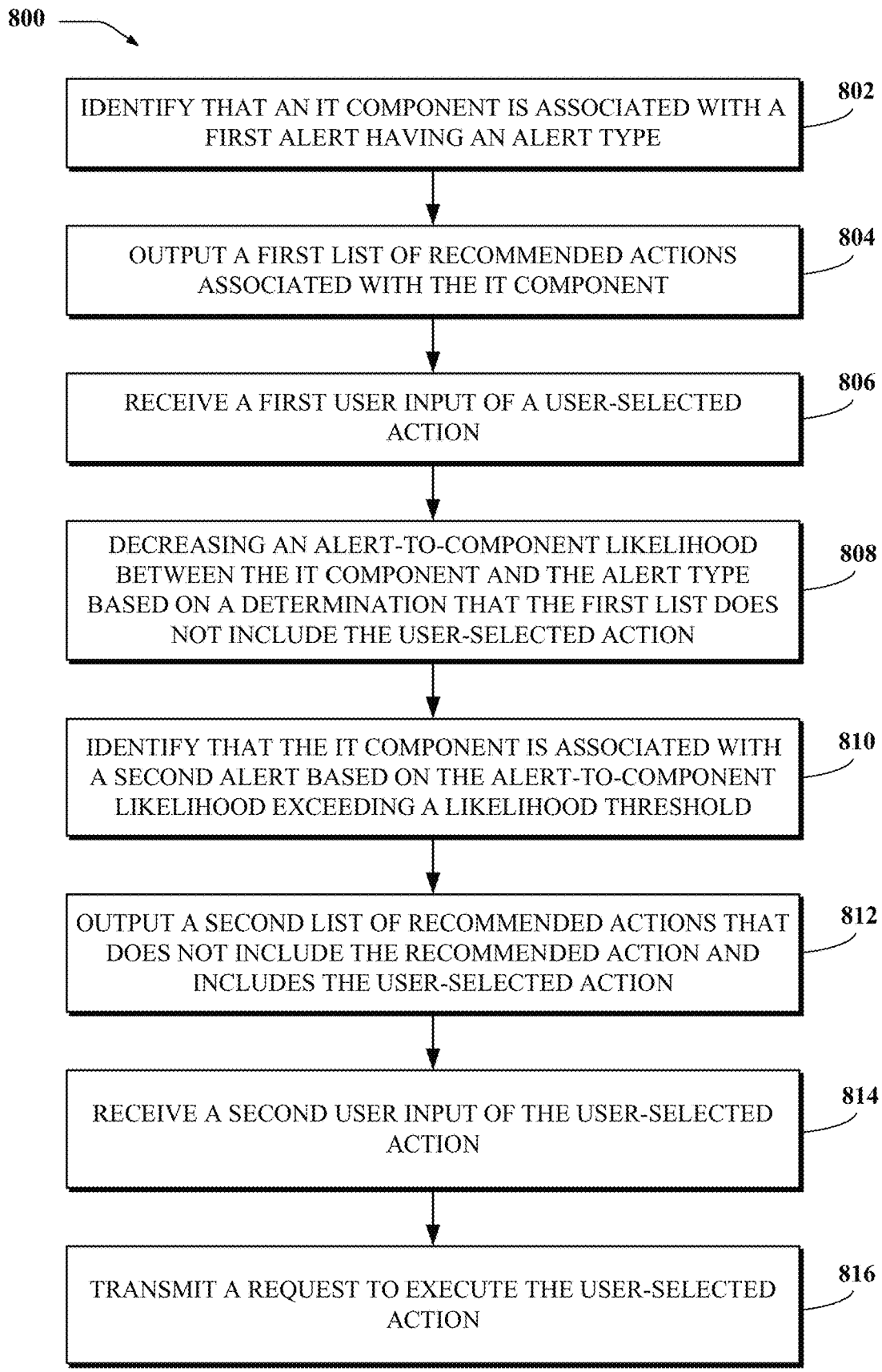
FIG. 8 is an example of a flowchart of a technique for action recommendations for alert resolution.

FIG. 8 is an example of a flowchart of a technique 800 for action recommendations for alert resolution. The technique 800 can be executed using computing devices, such as the systems, hardware, and software described with respect to FIGS. 1-6. The technique 800 can be implemented in or by an EMB, such as the system 400 of FIG. 4. The technique 800 may be implemented in whole or in part in or by the action recommendation software 418 of the system 400 of FIG. 4 or the action recommendation software 500 of FIG. 5. The technique 800 can be implemented, for example, as a software program that may be executed by computing devices such as the network computer 300 of FIG. 3. The software program can include machine-readable instructions that may be stored in a memory (e.g., a non-transitory computer readable medium), such as the memory 304, the processor-readable stationary storage device 334, or the processor-readable removable storage device 336 of FIG. 3, and that, when executed by a processor, such as the processor 302 of FIG. 3, may cause the computing device to perform the technique 800. The technique 800 can be implemented using specialized hardware or firmware. Multiple processors, memories, or both, may be used.

At 802, an IT component is identified as being associated with a first alert that has an alert type. In an example, the IT component can be identified using string matching on data associated with the first alert. The alert may be triggered responsive to an event in the managed environment. Triggering an event can mean creating an alert object, or the like, corresponding to the event. At 804, a first list of recommended actions associated with the IT component is output for user (i.e., responder) selection. For example, the responder may navigate to a user interface (not shown) provided by the EMB so that the responder can select an action to execute in an attempt to resolve the alert. The user interface includes the list of recommended actions and may also allow the responder to search within or browse a catalogue of available actions for a more suitable action. The available actions may be grouped in a data store by IT component, such as described with respect to actions library 512 of FIG. 5. As such the list of recommended actions may be obtained based using the IT component from the actions library 512 of FIG. 5 and can include a recommended action associated with the IT component.

At 806, a first user input of a user-selected action is received from the responder. As mentioned, the responder can select an action from the list or can chose an action not shown in the list and that may not be associated with the IT component. At 808, an alert-to-component likelihood between (i.e., the likelihood of an association between) the IT component and the alert type may be decreased (such as by a learning algorithm) based on a determination that the first list does not include the user-selected action.

At 810, the IT component is identified as being associated with a second alert. However, this time, the technique 800 identifies the IT component based on determining that the alert-to-component likelihood exceeds an alert-to-component likelihood threshold. At 812, a second list of recommended actions associated with the IT component is output for user selection. This time, the second list of recommended actions does not include the (previously) recommended action and includes the user-selected action. That is, action recommendation has learned that the previously recommended action is not helpful in resolving alerts of the alert type and that the user-selected action is at least helpful in resolving such alerts. As such, in an example, the recommended actions of the second list can be identified based on respective action-to-component association likelihoods between the IT component and the recommended actions exceeding an action-to-component likelihood threshold. At 814, a second user input of the user-selected action is received from the responder. At 816, request to perform the user-selected action may be transmitted into the managed environment.

In an example, the technique 800 can include modifying an action-to-component likelihood between the user-selected action and the IT component based on feedback data relating to whether the user-selected action resolved the second alert. The feedback data can be as described above. In an example, the technique 800 can determine that the user-selected action resolved the second alert based on a determination that no additional requests to perform actions were received between a first time of receiving the user-selected action and a second time of receiving user input resolving the second alert. As user interface of the EMB may allow the responder to provide the user input resolving the second alert. For example, the responder may change a status of the alert to "resolved." In an example, the technique 800 can determine that the user-selected action resolved the second alert based on user input indicating that the user-selected action resolved the second alert.

In an example, the technique 800 can include receiving a third user selection of the user-selected action responsive to a third alert not associated with a second IT component. Responsive to the third user selection, the user-selected action can be associated with the second IT component.

Figure 9:
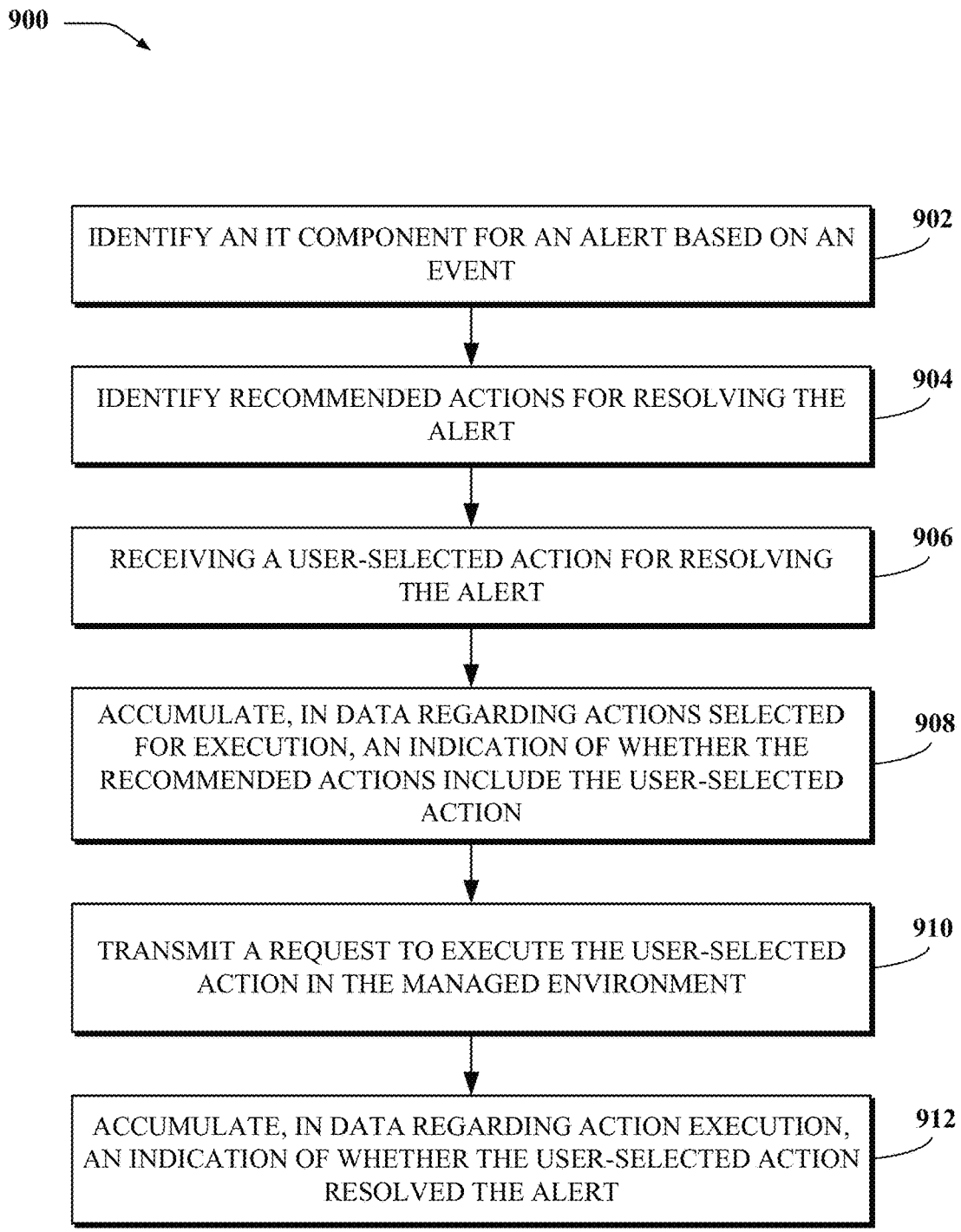
FIG. 9 is another example of a flowchart of a technique for action recommendations for alert resolution.

FIG. 9 is another example of a flowchart of a technique 900 for action recommendations for alert resolution. The technique 900 can be executed using computing devices, such as the systems, hardware, and software described with respect to FIGS. 1-6. The technique 900 can be implemented in or by an EMB, such as the system 400 of FIG. 4. The technique 900 may be implemented in whole or in part in or by the action recommendation software 418 of the system 400 of FIG. 4 or the action recommendation software 500 of FIG. 5. The technique 900 can be implemented, for example, as a software program that may be executed by computing devices such as the network computer 300 of FIG. 3. The software program can include machine-readable instructions that may be stored in a memory (e.g., a non-transitory computer readable medium), such as the memory 304, the processor-readable stationary storage device 334, or the processor-readable removable storage device 336 of FIG. 3, and that, when executed by a processor, such as the processor 302 of FIG. 3, may cause the computing device to perform the technique 900. The technique 900 can be implemented using specialized hardware or firmware. Multiple processors, memories, or both, may be used.

At 902, an IT component is identified for an alert based on an event. The event may be received from a managed environment. The IT component can be identified as described above with respect to 802 of FIG. 8. At 904, recommended actions for resolving the alert are identified. The recommended actions can be identified based on the identification of the information technology (IT) component. The recommended actions can be identified as described with respect to 616 of FIG. 6 or 712 of FIG. In an example, the recommended actions can be identified based on respective action-to-component association likelihoods between the IT component and the recommended actions exceeding an action-to-component likelihood threshold.

At 906, a user-selected action for resolving the alert is received. The user-selected action can be received from a responder, as described above. At 908, an indication (e.g., data indicating) whether the recommended actions include the user-selected action is accumulated in data regarding actions selected for execution. At 910, a request to execute (e.g., perform) the user-selected action in the managed environment is transmitted into the managed environment. At 912, an indication (e.g., data indicating) whether the user-selected action resolved the alert is accumulated in data regarding action execution.

In an example, the data regarding actions selected for execution can be used to improve identifying IT components for alerts. In an example, the data regarding action execution can be used to improve identifying actions for resolving alerts. In an example, whether the user-selected action resolved the alert can be determined using explicit feedback, as described above. In an example, whether the user-selected action resolved the alert can be determined based on whether additional requests to execute actions were received between a first time of receiving the user-selected action and a second time of receiving user input resolving the alert. In an example, whether the user-selected action resolved the alert can be determined based on whether user input indicating that the user-selected action resolved the alert is received.

Another technique of the disclosed implementations includes triggering an alert responsive to an event in a managed environment. An IT component in the managed environment is identified using the alert. The IT component can be identified based on an alert-to-component likelihood between the IT component and the alert exceeding an alert-to-component likelihood threshold. A list of recommended actions associated with the IT component is presented to a user. The recommended actions can be identified based on respective action-to-component likelihoods between the IT component and the recommended actions exceeding an action-to-component likelihood threshold. A user-selected action to execute with respect to the IT component is received from the user. A request to execute the user-selected action is transmitted. A determination is made whether the user-selected action resolved the alert. An action-to-component likelihood between the user-selected action and the component based is modified based on the feedback data.

In an example, an output of the user-selected action includes the feedback data. In an example, feedback data is implicit feedback data that is based on determining that no additional requests to execute actions were received between a first time of receiving the user-selected action and a second time of receiving user input resolving the alert. In an example, the feedback data can be user input indicating that the user-selected action resolved the alert. In an example, whether the recommended actions include the user-selected action can be accumulated in data regarding actions selected for execution, and whether the user-selected action resolved the alert can be accumulated in data regarding action execution. Learning algorithms can use the data regarding actions selected for execution and the data regarding action execution.

For simplicity of explanation, the techniques 600-900 of FIGS. 6-9, respectively, are each depicted and described herein as respective series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein the term, "software" refers to logic embodied in hardware or software instructions, which can be written in a programming language, such as C, C++, Objective-C, COBOL, Java™, PHP, Perl, JavaScript, Ruby, VBScript, Microsoft .NET™ languages such as C#, and/or the like. An software may be compiled into executable programs or written in interpreted programming languages. Software may be callable from other software or from themselves. Software described herein refer to one or more logical modules that can be merged with other software or applications, or can be divided into sub-software. The software can be stored in non-transitory computer-readable medium or computer storage devices and be stored on and executed by one or more general purpose computers, thus creating a special purpose computer configured to provide the software.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
   identifying that an information technology (IT) component is associated with a first alert having an alert type;
   outputting, for user selection, first recommended actions associated with the IT component, wherein the first recommended actions include a recommended action associated with the IT component;
   receiving a first user input of a user-selected action;
   determining that the first recommended actions do not include the user-selected action;
   decreasing an alert-to-component likelihood between the IT component and the alert type based on the determination that the first recommended actions do not include the user-selected action;
   identifying that the IT component is associated with a second alert based on the alert-to-component likelihood exceeding an alert-to-component likelihood threshold;
   outputting, for user selection, second recommended actions associated with the IT component, wherein the second recommended actions do not include the recommended action and includes the user-selected action;
   receiving a second user input of the user-selected action;
   transmitting a request to execute the user-selected action;
   receiving a third user input of the user-selected action responsive to a third alert not associated with another IT component that is different from the IT component; and
   responsive to the third user input, associating the user-selected action with the another IT component.

2. The method of claim 1, further comprising:
   modifying an action-to-component likelihood between the user-selected action and the IT component based on feedback data relating to whether the user-selected action resolved the second alert.

3. The method of claim 1, further comprising:
   determining that the user-selected action resolved the second alert based on a determination that no additional requests to execute actions were received between a first time of receiving the user-selected action and a second time of receiving user input resolving the second alert.

4. The method of claim 1, further comprising:
   determining that the user-selected action resolved the second alert based on user input indicating that the user-selected action resolved the second alert.

5. The method of claim 1, wherein the second recommended actions are identified based on respective action-to-component association likelihoods between the IT component and the second recommended actions exceeding an action-to-component likelihood threshold.

6. The method of claim 1, wherein the IT component is identified using string matching on data associated with the first alert.

7. A system, comprising:
   a memory; and
   a processor, the processor configured to execute instructions stored in the memory to:
   identify that an information technology (IT) component is associated with a first alert having an alert type;
   output, for user selection, first recommended actions associated with the IT component, wherein the first recommended actions include a recommended action associated with the IT component;
   receive a first user input of a user-selected action;
   determine that the first recommended actions do not include the user-selected action;
   decrease an alert-to-component likelihood between the IT component and the alert type based on the determination that the first recommended actions do not include the user-selected action;
   identify that the IT component is associated with a second alert based on the alert-to-component likelihood exceeding an alert-to-component likelihood threshold;
   output, for user selection, second recommended actions associated with the IT component, wherein the second recommended actions do not include the recommended action and includes the user-selected action;
receive a second user input of the user-selected action;
transmit a request to execute the user-selected action;
receive a third user input of the user-selected action responsive to a third alert not associated with another IT component that is different from the IT component; and
responsive to the third user input, associate the user-selected action with the another IT component.

8. The system of claim 7, wherein the processor is further configured to execute instructions stored in the memory to:
modify an action-to-component likelihood between the user-selected action and the IT component based on feedback data relating to whether the user-selected action resolved the second alert.

9. The system of claim 7, wherein the processor is further configured to execute instructions stored in the memory to:
determine that the user-selected action resolved the second alert based on a determination that no additional requests to execute actions were received between a first time of receiving the user-selected action and a second time of receiving user input resolving the second alert.

10. The system of claim 7, wherein the processor is further configured to execute instructions stored in the memory to:
determine that the user-selected action resolved the second alert based on user input indicating that the user-selected action resolved the second alert.

11. The system of claim 7, wherein the second recommended actions are identified based on respective action-to-component association likelihoods between the IT component and the second recommended actions exceeding an action-to-component likelihood threshold.

12. The system of claim 7, wherein the IT component is identified using string matching on data associated with the first alert.

13. A non-transitory computer readable medium storing instructions operable to cause one or more processors to perform operations comprising:
identifying that an information technology (IT) component is associated with a first alert having an alert type;
outputting, for user selection, first recommended actions associated with the IT component, wherein the first recommended actions include a recommended action associated with the IT component;
receiving a first user input of a user-selected action;
determining that the first recommended actions do not include the user-selected action;
decreasing an alert-to-component likelihood between the IT component and the alert type based on the determination that the first recommended actions do not include the user-selected action;
identifying that the IT component is associated with a second alert based on the alert-to-component likelihood exceeding an alert-to-component likelihood threshold;
outputting, for user selection, second recommended actions associated with the IT component, wherein the second recommended actions do not include the recommended action and includes the user-selected action;
receiving a second user input of the user-selected action;
transmitting a request to execute the user-selected action;
receiving a third user input of the user-selected action responsive to a third alert not associated with another IT component that is different from the IT component; and
responsive to the third user input, associating the user-selected action with the another IT component.

14. The non-transitory computer readable medium of claim 13, wherein the operations further comprise:
modifying an action-to-component likelihood between the user-selected action and the IT component based on feedback data relating to whether the user-selected action resolved the second alert.

15. The non-transitory computer readable medium of claim 13, wherein the operations further comprise:
determining that the user-selected action resolved the second alert based on a determination that no additional requests to execute actions were received between a first time of receiving the user-selected action and a second time of receiving user input resolving the second alert.

16. The non-transitory computer readable medium of claim 13, wherein the operations further comprise:
determining that the user-selected action resolved the second alert based on user input indicating that the user-selected action resolved the second alert.

17. The non-transitory computer readable medium of claim 13, wherein the second recommended actions are identified based on respective action-to-component association likelihoods between the IT component and the second recommended actions exceeding an action-to-component likelihood threshold.

* * * * *